United States Patent
Yamamoto

(10) Patent No.: US 9,571,746 B2
(45) Date of Patent: Feb. 14, 2017

(54) IMAGE PICKUP SYSTEM THAT DETECT FOCUS BY IRRADIATING AUXILIARY LIGHT, IMAGE PICKUP APPARATUS, LIGHT EMISSION DEVICE, AND FOCUS DETECTION METHOD

(71) Applicant: CANON KABUSHIKI KAISHA, Tokyo (JP)

(72) Inventor: Yutaka Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 14/632,388

(22) Filed: Feb. 26, 2015

(65) Prior Publication Data

US 2015/0244921 A1 Aug. 27, 2015

(30) Foreign Application Priority Data

Feb. 27, 2014 (JP) .................................. 2014-036628

(51) Int. Cl.
| | |
|---|---|
| *H04N 5/235* | (2006.01) |
| *H04N 5/232* | (2006.01) |
| *G03B 15/05* | (2006.01) |
| *H04N 5/225* | (2006.01) |
| *G03B 7/17* | (2014.01) |

(52) U.S. Cl.
CPC .............. *H04N 5/2354* (2013.01); *G03B 7/17* (2015.01); *G03B 15/05* (2013.01); *H04N 5/2256* (2013.01); *H04N 5/2351* (2013.01); *H04N 5/23212* (2013.01); *H04N 5/23241* (2013.01); *G03B 2215/0521* (2013.01)

(58) Field of Classification Search
CPC H04N 5/2354; H04N 5/2256; H04N 5/23241; H04N 5/23212; G02B 7/17; G02B 15/05
USPC .................. 348/345, 348, 370, 371; 396/106
See application file for complete search history.

(56) References Cited

U.S. PATENT DOCUMENTS

| | | | | |
|---|---|---|---|---|
| 5,150,146 A | * | 9/1992 | Ueda .......................... | G02B 7/32 396/104 |
| 6,067,422 A | * | 5/2000 | Tokunaga ................ | G03B 7/16 396/157 |

(Continued)

FOREIGN PATENT DOCUMENTS

JP 4324318 B2 9/2009

*Primary Examiner* — Nhan T Tran
(74) *Attorney, Agent, or Firm* — Rossi, Kimms & McDowell LLP

(57) ABSTRACT

An image pickup apparatus capable of obtaining a high AF accuracy while reducing unnecessary power consumption and a release delay when photographing while detecting a focusing state using auxiliary light. The image pickup apparatus is capable of mounting a light emission device with which a first light emitting section of which an irradiation direction can be changed with respect to a body of the light emission device and a second light emitting section of which an irradiation direction is fixed to the body are provided. An obtaining unit obtains information about the irradiation direction of the first light emitting section. A control unit controls one of the first light emitting section and the second light emitting section on the basis of the information about the irradiation direction obtained as a light emitting section for irradiating with auxiliary light at the time when the focus detection unit performs focus detection.

20 Claims, 20 Drawing Sheets

(56) References Cited

U.S. PATENT DOCUMENTS

| | | | | |
|---|---|---|---|---|
| 6,167,202 | A | * | 12/2000 | Fukui ........................ G03B 7/16 396/157 |
| 2002/0186971 | A1 | * | 12/2002 | Murata ................... G03B 13/36 396/106 |
| 2014/0375837 | A1 | * | 12/2014 | Ichihara ................ H04N 5/2354 348/371 |
| 2015/0037021 | A1 | * | 2/2015 | Umehara ............. H04N 5/2354 396/174 |

* cited by examiner

IMAGE PICKUP SYSTEM THAT DETECT FOCUS BY IRRADIATING AUXILIARY LIGHT, IMAGE PICKUP APPARATUS, LIGHT EMISSION DEVICE, AND FOCUS DETECTION METHOD

BACKGROUND OF THE INVENTION

Field of the Invention

The present invention relates to an image pickup system that detects focused state to a subject by irradiating a field with auxiliary light, an image pickup apparatus and a light emission device that are included in the image pickup system, and a focus detection method in the image pickup system.

Description of the Related Art

Image pickup apparatuses, such as a film camera and an electronic camera, employ LED light irradiation that irradiates a subject with LED light pattern and flash irradiation that irradiates a subject with flash light emitted from a discharge tube of a light emission device as methods for irradiating a subject with auxiliary light at the time of detecting a focused state of the subject. For example, an autofocus device that performs focus detection with auxiliary light from a flash device and focus detection with auxiliary light from an LED, selects a focus detection result that has high reliability, and performs lens drive control is proposed (see Japanese Patent Publication No. 4324318 (JP 4324318 B2)).

Since the irradiation with the auxiliary light from an LED (referred to as "LED auxiliary light", hereinafter) is pattern irradiation, it is effective to a low-contrast subject, but its irradiation range is restricted. On the other hand, although the irradiation range of the auxiliary light from a flash device (referred to as "flash auxiliary light", hereafter) is wide and is effective to the autofocus (AF) within a wide area in an image pickup screen, it is not enough effective to a low-contrast subject. Accordingly, the technique disclosed in the above-mentioned publication aims to improve AF accuracy by bringing out the merit of each irradiation method exactly in consideration of the merit and demerit of these irradiation methods.

In light photography (referred to as "flash light photography", hereafter), an image pickup apparatus may use a photographing method what is called bounce flash photography by which irradiates a ceiling etc. with flash light and irradiates a subject with diffuse reflection from the ceiling etc. With the technique described in the above-mentioned patent publication, when a subject is irradiated with the flash auxiliary light in the setting of the bounce flash photography, there is a possibility that a focusing state is not appropriately detected because the subject is not enough irradiated with the flash auxiliary light. Moreover, when the flash auxiliary light is emitted in the state where there is low chance of the focusing state being detected appropriately, there is a problem of consuming electric power superfluously. Furthermore, it is necessary to wait for recovery of the electrical energy accumulated in a capacitor of an electronic flash device in order to perform the flash light photography as the original purpose after emitting the flash auxiliary light. Accordingly, when a release process is performed during the accumulation of the electrical energy, a release delay occurs.

On the other hand, since a light amount of pattern auxiliary light like LED auxiliary light is smaller than that of the flash auxiliary light in general, an area in which the AF auxiliary light functions effectively is limited to the center area in a photographing area of an image pickup apparatus and to a range of a short distance, and there is a problem that it cannot respond to a wide AF area. Accordingly, if priority is always given to irradiation with the pattern auxiliary light, there is a case where the pattern auxiliary light is insufficient to detect the focusing state. In such a case, irradiation with the flash auxiliary light is needed after irradiation with the pattern auxiliary light as a result, which causes a problem of a release delay.

SUMMARY OF THE INVENTION

The present invention provides a technique that is capable of obtaining a high AF accuracy while reducing unnecessary power consumption and a release delay when photographing while detecting a focusing state using the auxiliary light.

Accordingly, a first aspect of the present invention provides an image pickup apparatus capable of mounting a light emission device with which a first light emitting section of which an irradiation direction can be changed with respect to a body of the light emission device and a second light emitting section of which an irradiation direction is fixed to the body are provided, comprising a focus detection unit, an obtaining unit configured to obtain information about the irradiation direction of the first light emitting section, and a control unit configured to control one of the first light emitting section and the second light emitting section on the basis of the information about the irradiation direction obtained by the obtaining unit as a light emitting section for irradiating with auxiliary light at the time when the focus detection unit performs focus detection.

Accordingly, a second aspect of the present invention provides a light emission device capable of mounting on an image pickup apparatus, comprising a first light emitting section of which an irradiation direction can be changed with respect to a body of the light emission device, a second light emitting section of which an irradiation direction is fixed to the body, and a control unit configured to control one of the first light emitting section and the second light emitting section as a light emitting section for irradiating with auxiliary light at the time when the image pickup apparatus performs focus detection according to the irradiation direction of the first light emitting section.

Accordingly, a third aspect of the present invention provides an image pickup system comprising a focus detection unit, a first light emitting section of which an irradiation direction can be changed with respect to a body of the light emission device, a second light emitting section of which an irradiation direction is fixed to the body, and a control unit configured to control one of the first light emitting section and the second light emitting section as a light emitting section for irradiating with auxiliary light at the time when the focus detection unit performs focus detection according to the irradiation direction of the first light emitting section.

Accordingly, a fourth aspect of the present invention provides a focus detection method for an image pickup system having a focus detection unit, a first light emitting section of which an irradiation direction can be changed with respect to a body, and a second light emitting section of which an irradiation direction is fixed to the body, the focus detection method comprising an obtaining step of obtaining information about the irradiation direction of the first light emitting section, a control step of controlling one of the first light emitting section and the second light emitting section as a light emitting section for irradiating with auxiliary light at the time when the focus detection unit performs focus detection according to the irradiation direction of the first light emitting section, and a focus detection step of performing focus detection while irradiating with the auxiliary light by one of the first light emitting section and the second light emitting section.

According to the present invention, since a delay of a release control can be prevented and a subject is irradiated with suitable auxiliary light, a high AF accuracy is obtained.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Here, an image pickup system that consists of a digital still camera as an example of an image pickup apparatus and an external light emission device that is freely detached and attached to the digital still camera is taken up.

Figure 1:
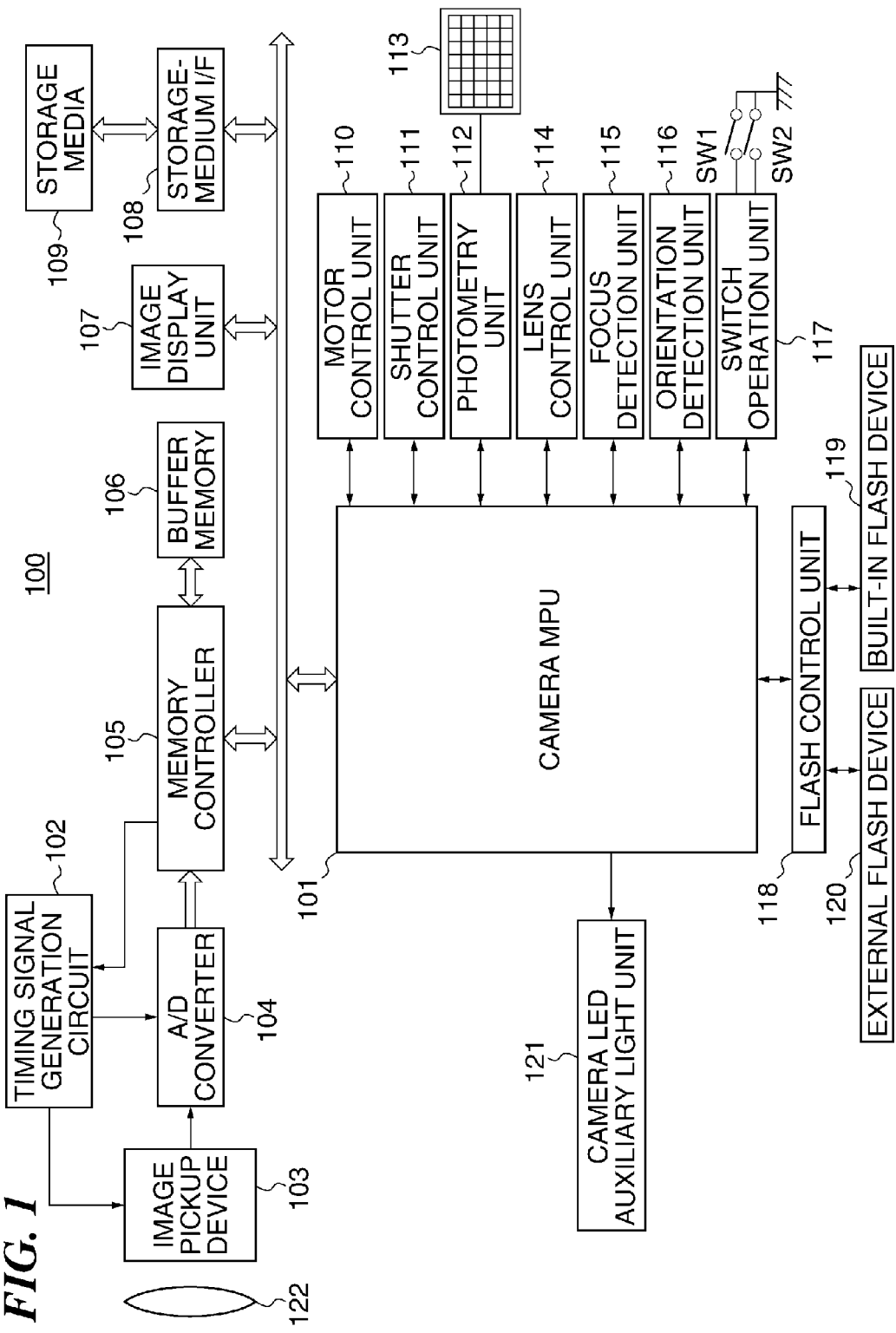
FIG. 1 is a block diagram schematically showing a configuration of a digital still camera that constitutes an image pickup system according to an embodiment of the present invention.

First, a first embodiment of the present invention will be described. FIG. 1 is a block diagram schematically showing a configuration of a digital still camera 100 that constitutes an image pickup system according to the first embodiment of the present invention. It should be noted that the configuration of the digital still camera 100 shown in FIG. 1 is common to the first embodiment and to a second embodiment mentioned later. Although the digital still camera 100 is a lens interchangeable single-lens reflex camera equipped with the quick return mirror, it is not limited to this.

The digital still camera 100 is provided with a camera MPU 101, an image pickup optical system 122, a timing signal generation circuit 102, an image pickup device 103, an A/D converter 104, a memory controller 105, a buffer memory 106, and an image display unit 107.

The camera MPU 101 controls the entire actions of the image pickup system including a photographing sequence. The image pickup optical system 122 consists of a plurality of lens groups, such as a zoom lens and a focus lens, a diaphragm, a shutter, etc., and forms an optical image on the image pickup device 103 using reflected light from a subject. The image pickup device 103 is an image sensor, such as a CCD, a CMOS, etc., which converts the optical image formed using the reflected light from the subject into an electrical signal. The timing signal generation circuit 102 generates a timing signal needed to operate the image pickup device 103. The A/D converter 104 converts an analog electric signal (analog image data) read from the image pickup device 103 into a digital electric signal (digital image data).

The memory controller 105 controls reading and writing of a memory (not shown), a refreshment operation of the buffer memory 106, etc. The buffer memory 106 temporarily stores digital image data outputted from the A/D converter 104 and image data of an image displayed on the image display unit 107. The image display unit 107 has a display unit, such as a liquid crystal panel or an organic EL panel, and displays image data stored in the buffer memory 106 as an image.

The digital still camera 100 is constituted so that a storage media 109 like a memory card is insertable and removable, and is provided with a storage-medium I/F 108 for connecting the storage medium 109 mounted with the camera MPU 101. The storage media 109 may be a storage media, such as a hard disk, built in the digital camera 100.

The digital camera 100 is provided with a motor control unit 110, a shutter control unit 111, a photometry unit 112, a multi-division photometry sensor 113, a lens control unit 114, a focus detection unit 115, an orientation detection unit 116, and a switch operation unit 117. Moreover, the digital still camera 100 is provided with a flash control unit 118, a built-in flash device 119 (a first auxiliary-light-emission unit), and a camera LED auxiliary light unit 121 (a second auxiliary-light-emission unit). Furthermore, an external flash device 120 can detach and attach freely as an external light emission device.

The motor control unit 110 switches a mirror (not shown) between a mirror-up position and a mirror-down position and charges the shutter by controlling a motor (not shown) according to a signal from the camera MPU 101 at the time of an exposure operation. The shutter control unit 111 controls an exposure operation by cutting electricity of the shutter (a focal-plane shutter equipped with a shutter front curtain and a shutter second curtain) with which the image pickup optical system 122 is provided according to a signal from the camera MPU 101 to run the shutter front curtain and the shutter second curtain.

The multi-division photometry sensor 113 divides an image pick-up screen into a plurality of areas. The photometry unit 112 outputs a luminance signal of each of the areas from the multi-division photometry sensor 113 to the camera MPU 101. The camera MPU 101 performs photometry arithmetic, such as AV (an aperture value), a TV (shutter speed), and an ISO (a sensitivity of the image pickup device 103), on the basis of the luminance signal obtained from the photometry unit 112. Moreover, the photometry unit 112 outputs a luminance signal when the built-in flash device 119 or the external flash device 120 emits preliminary light (pre-emission) towards a subject to the camera MPU 101, and calculates a flash light amount (a main emission amount) at the time of main exposure (main photography).

The lens control unit 114 communicates with the camera MPU 101 through lens mount contacts (not shown), and operates a lens drive motor and a diaphragm motor (not shown) to control the focusing and the aperture of the image pickup optical system 122. The focus detection unit 115 has a function to detect a defocusing amount to a subject for AF (autofocus) using a well-known phase difference detection method etc. The orientation detection unit 116 detects an inclination of the digital still camera 100 in the rotational direction around a photographing optical axis.

The switch operation unit 117 detects switching statuses of a first switch (SW1) and a second switch (SW2), and the detection results are transmitted to the camera MPU 101. The SW1 is turned on by a first stroke (half press) of a release button (not shown), and the camera MPU 101 starts the AF and the photometry on the basis of an ON signal of the SW1. The SW2 is turned on by a second stroke (full press) of the release button, and the camera MPU 101 makes an exposure operation start on the basis of an ON signal of the SW2. It should be noted that the switch operation unit 117 detects signals that are generated by operating members (not shown) other than the SW1 and the SW2, and transmits the detection results to the camera MPU 101.

The flash control unit 118 controls the emission operations (a pre-emission, a main emission, an auxiliary light emission, etc.) to the built-in flash device 119 and the external flash device 120 according to instructions from the camera MPU 101. The built-in flash device 119 and the external flash device 120 emit flash light to the field side at the time of the main photography, and emit the flash auxiliary light for the focus detection. The camera LED auxiliary light unit 121 irradiates the field side with near-infrared light (LED auxiliary light) that has a specified pattern and is used as auxiliary light for the focus detection control by the focus detection unit 115. Moreover, the irradiation direction of the camera LED auxiliary light unit 121 is fixed with respect to the camera body.

The camera MPU 101 functions as an auxiliary light control unit that controls irradiation to the field side with the auxiliary light by the built-in flash device 119 or the external flash device 120 for the focus detection on the basis of the luminance signal output from the photometry unit 112. Specifically, the camera MPU 101 instructs an emission of the flash auxiliary light to the built-in flash device 119 or the external flash device 120 through the flash control unit 118. Alternatively, the camera MPU 101 instructs an emission of the LED auxiliary light to the camera LED auxiliary light unit 121 or a flash-side LED auxiliary light unit 207 (see FIG. 2) of the external flash device 120 through the flash control unit 118.

Figure 2:
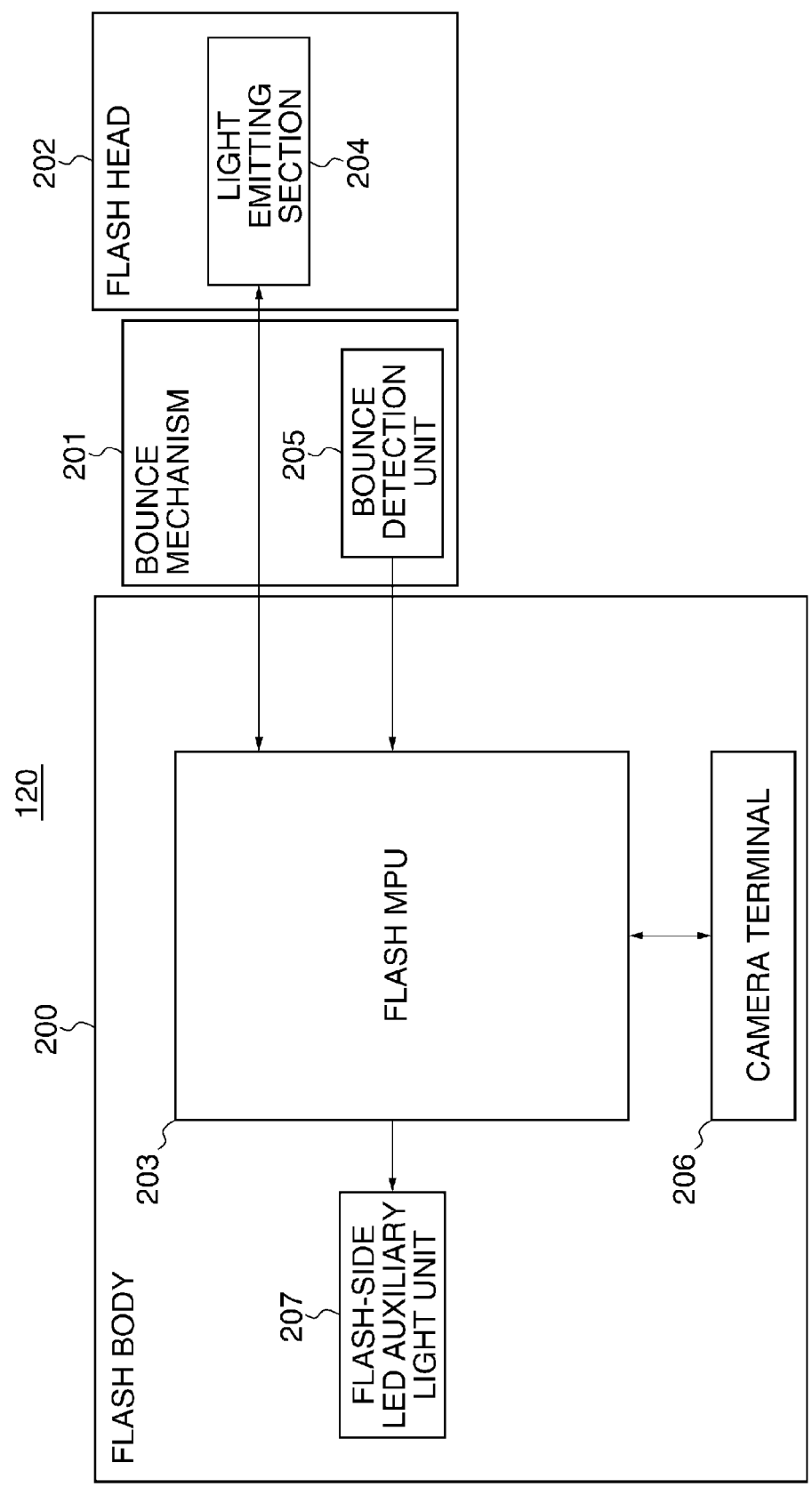
FIG. 2 is a block diagram schematically showing an external flash device that constitutes the image pickup system according to a first embodiment and that is freely detached and attached to the digital still camera in FIG. 1.
Figure 3A:
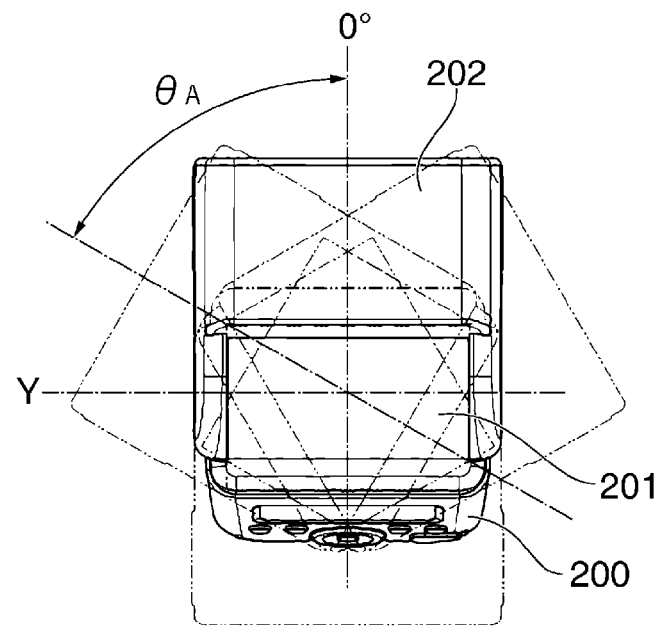
FIG. 3A, FIG. 3B, and FIG. 3C are external views (orthogonal views) of the external flash device in FIG. 2.
Figure 3B:
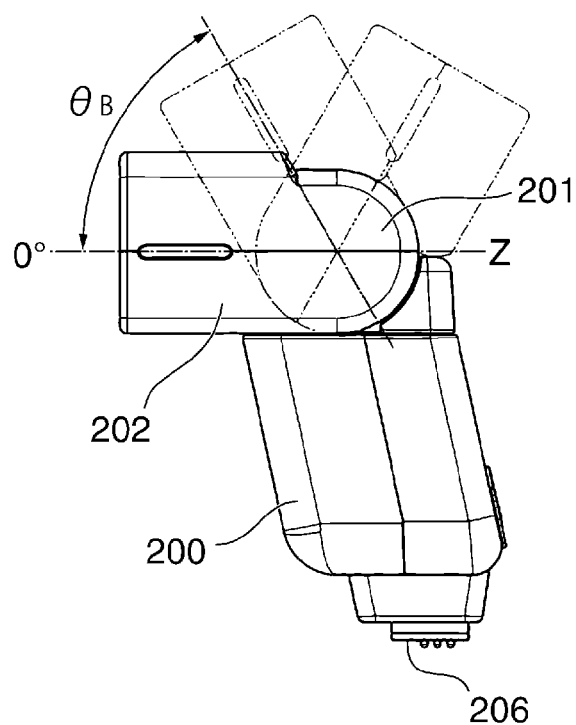
Figure 3C:
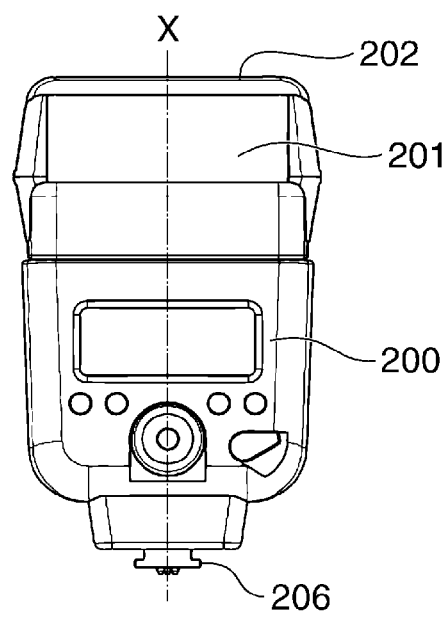

FIG. 2 is a block diagram schematically showing the configuration of the external flash device 120. Moreover, FIG. 3A, FIG. 3B, and FIG. 3C are external views (orthogonal views) of the external flash device 120. FIG. 3A is a top view, FIG. 3B is a side view, and FIG. 3C is a back view. The external flash device 120 can be attached to and detached from an accessory shoe (not shown) provided on the digital camera 100.

The external flash device 120 consists of a flash body 200, a bounce mechanism 201, and a flash head 202. The flash body 200 has a flash MPU 203, a camera terminal 206, and the flash-side LED auxiliary light unit 207 in addition to a main substrate (not shown) on which the flash MPU 203 is implemented, various operation members, such as a power switch, and a display unit etc.

The flash MPU 203 controls entire actions of the external flash device 120 including an emission control sequence of the external flash device 120. The camera terminal 206 connects the external flash device 120 to the digital still camera 100 mechanically and electrically. The camera MPU 101 communicates with the flash MPU 203 through the flash control unit 118 and the camera terminal 206. The flash-side LED auxiliary light unit 207 irradiates the field side with the LED auxiliary light, such as near-infrared light, that has the specified pattern, as the auxiliary light for the focus detection control by the camera MPU 101 through the focus detection unit 115 in the same manner as the camera LED auxiliary light unit 121 of the digital still camera 100. Moreover, the irradiation direction of the flash-side LED auxiliary light unit 207 is fixed with respect to the flash body 200.

The bounce mechanism 201 has a bounce detection unit 205 in addition to a flash main capacitor (not shown) etc. The bounce mechanism 201 is an irradiation direction change mechanism that changes an irradiation direction and is well-known in a general external flash device, and holds the flash head 202 rotatably in a horizontal direction and a vertical direction, respectively, with respect to the flash body 200. Use of the bounce mechanism 201 allows emitting flash light while changing the irradiation direction (it is referred to as a "bounce emission", hereafter).

The bounce detection unit 205 is a rotation angle detection sensor that consists of a substrate on which a well-known phase pattern is formed and a contact brush, and detects whether the flash head 202 is in the status for performing the bounce emission. Moreover, the bounce detection unit 205 detects a horizontal bounce angle $\theta_A$ and a vertical bounce angle $\theta_B$ of the flash head 202 as shown in FIG. 3A, FIG. 3B, and FIG. 3C. Namely, the horizontal bounce angle $\theta_A$ that is a rotation angle of the flash head 202 around an X-axis (vertical axis) and the vertical bounce angle $\theta_B$ that is a rotation angle around a Y-axis (horizontal axis) with respect to a normal position (the bounce angles are 0 degrees) that is a reference position at which the flash head 202 directly faces to the field side (subject) are detected. It should be noted that this embodiment defines that "the flash head 202 is in a bounce state" when the bounce angles of the flash head 202 do not satisfy a condition of $\theta_A=\theta_B=0$. Namely, the bounce state is a state where the irradiation direction of the external flash device 120 has been changed from a reference direction (an irradiation direction when the flash head 202 is in the normal position ($\theta_A=\theta_B=0$)). It should be noted that the reference direction may be parallel to the irradiation direction of the flash-side LED auxiliary light unit 207, or may be parallel to the photographing optical axis.

The flash head 202 has a light emitting section 204 that emits flash light. The light emitting section 204 consists of a discharge tube like a xenon tube that is a light source required for emitting flash light, a reflection umbrella, a Fresnel lens, and an emitting circuit that controls an emission according to an emission signal from the flash MPU 203.

Figure 4:
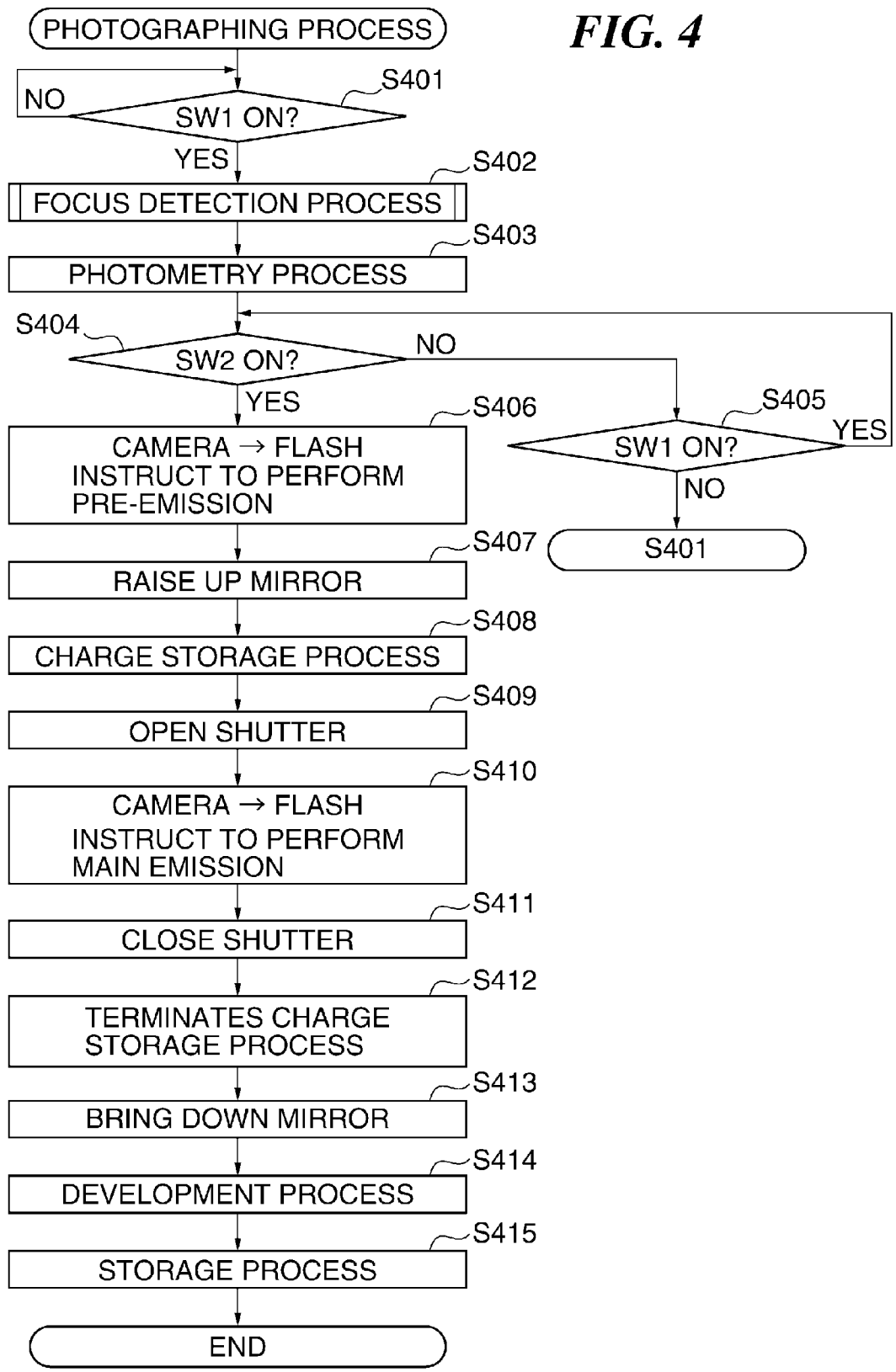
FIG. 4 is a flowchart showing a photographing process executed by the digital still camera of the image pickup system according to the first embodiment.

FIG. 4 is a flowchart showing a photographing process executed by the digital still camera 100. Each step shown in FIG. 4 is executed because the camera MPU 101 reads a control program from a ROM (not shown), expands it to a RAM (not shown), controls an action of each part of the digital still camera 100, and instructs the external flash device 120 of a predetermined action. It should be noted that "FLASH" in FIG. 4 means "the external flash device (the external flash device 120 in the first embodiment and the external flash device 130 in a second embodiment)", and the same notation shall be used in all the following flowcharts.

The camera MPU 101 detects the status of the SW1 of the switch operation unit 117 in step S401, and stands by while the SW1 is not pressed (NO in the step S401). When the SW1 is pressed (YES in the step S401), the process proceeds to step S402. In the step S402, the camera MPU 101 performs a focus detection process. The focus detection process includes a detection of a defocus amount, and an automatic focusing operation for moving a focus lens in the image pickup optical system 122 to an in-focus position by the lens control unit 114. At the time, an auxiliary light (the flash auxiliary light or the LED auxiliary light) is emitted if needed. The details of the focus detection process in the step S402 will be mentioned later.

Next, the camera MPU 101 performs a photometry process using the photometry unit 112 in step S403, and determines a shutter control value and an aperture control value according to a photographing mode set up. Then, the camera MPU 101 determines whether the SW2 of the switch operation unit 117 was pressed (turned ON) in step S404. When the SW2 was not pressed (NO in the step S404), the camera MPU 101 proceeds with the process to step S405. When the SW2 was pressed (YES in the step S404), the camera MPU 101 proceeds with the process to step S406. In the step S405, the camera MPU 101 detects the status of whether the SW1 is continuously pressed as with the step S401. When the SW1 is pressed (YES in the step S405), the camera MPU 101 returns the process to the step S404. When the SW1 is not pressed (NO in the step S405), the process returns to the step S401.

In step S406, the camera MPU 101 instructs the flash MPU 203 of the external flash device 120 to perform a pre-emission in a predetermined light amount using the light emitting section 204. When the external flash device 120 performs the pre-emission according to the instruction, the camera MPU 101 calculates a flash light amount (main emission amount) at the time of an exposure (photography) on the basis of the luminance signal obtained at the time of the pre-emission.

Next, the camera MPU 101 instructs the motor control unit 110 to raise up the mirror (to retract the mirror from a photographing light path) by controlling an action of a motor (not shown) in step S407. Then, the camera MPU 101 starts a charge storage process in the image pickup device 103 in step S408. Then, in step S409, the camera MPU 101 starts exposure to the image pickup device 103 by controlling the shutter control unit 111 to run the shutter front curtain (to open the shutter).

Next, the camera MPU 101 instructs the flash MPU 203 in step S410 to perform a main emission by the light emitting section 204 in the main emission amount calculated in the step S406. In step S410, the camera MPU 101 performs an exposure operation with specified exposure values (AV, TV, and ISO) in synchronization with the main emission.

Next, the camera MPU 101 instructs the shutter control unit 111 in step S411 to finish the exposure to the image pickup device 103 by running the shutter rear curtain (to close the shutter). In the following step S412, the camera MPU 101 terminates the charge storage process in the image pickup device 103. Then, the camera MPU 101 instructs the motor control unit 110 in step S413 to bring down the mirror (to return the mirror into the photographing light path) by controlling an action of the motor (not shown).

In step S414, the camera MPU 101 reads an image signal from the image pickup device 103, and temporarily stores the image data processed by the A/D converter 104 into the buffer memory 106. Then, when the entire image signals have been read from the image pickup device 103, a specified development process is applied to the image signals to generate image data. In the next step S415, the camera MPU 101 stores the image data generated in the step S414 to the storage medium 109 through the storage-medium I/F 108 as an image file. Thus, a series of procedures in the photographing process are finished.

Figure 5:
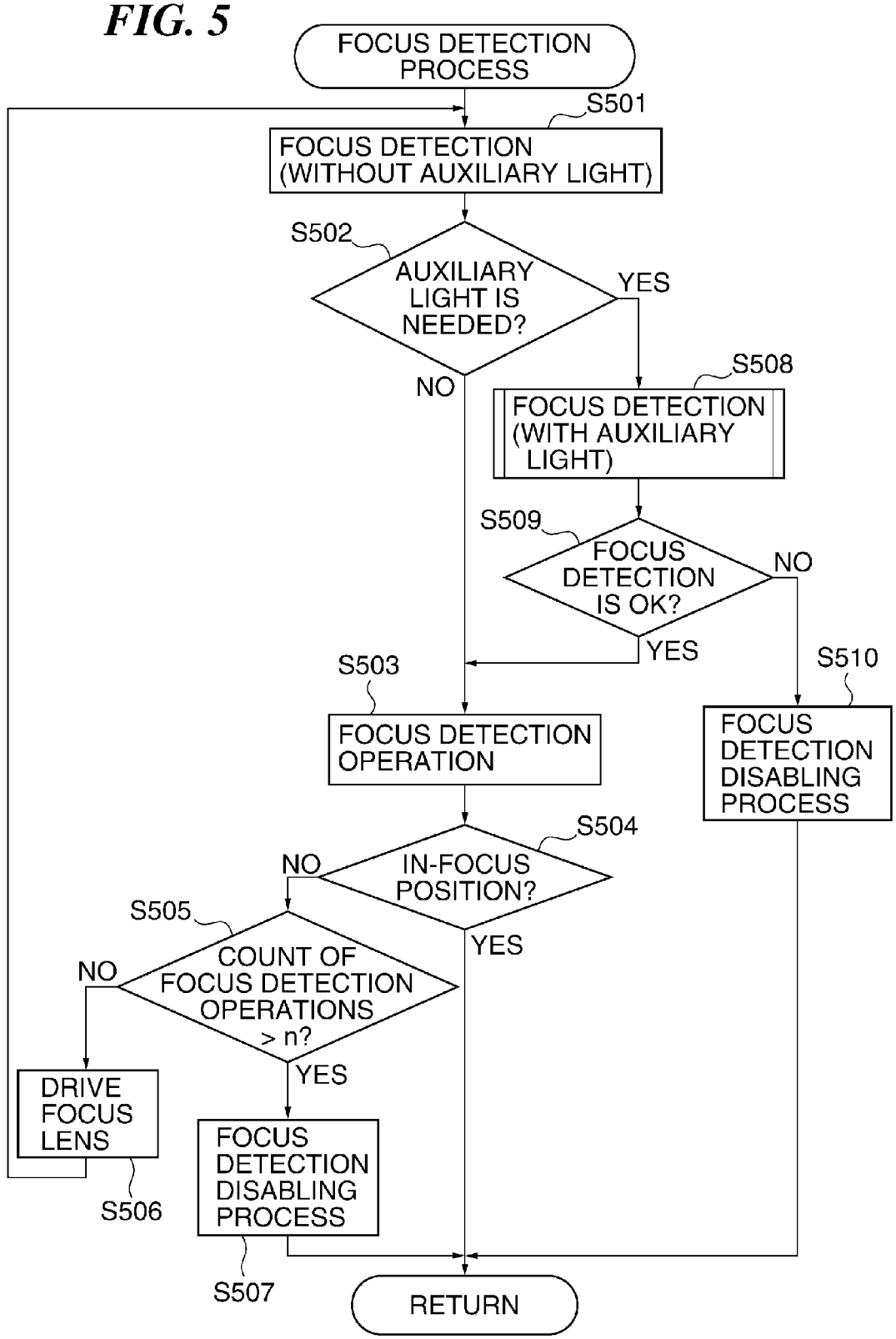
FIG. 5 is a flowchart showing a focus detection process executed in the step S402 in FIG. 4.

FIG. 5 is a flowchart showing the focus detection process executed by the digital still camera 100 in the step S402 of the flowchart in FIG. 4. Each step shown in FIG. 4 is executed because the camera MPU 101 reads a control program from the ROM (not shown), expands it to the RAM (not shown), and controls an action of each part of the digital still camera 100.

In the focus detection process, the camera MPU 101 controls the focus detection unit 115 to detect the focusing state without irradiating with the auxiliary light in step S501 first. In the following step S502, the camera MPU 101 determines whether the focusing state was able to be detected without irradiating with the auxiliary light. In the other words, the camera MPU 101 determines whether the focus detection needs the irradiation with the auxiliary light. When the irradiation with the auxiliary light is needed (YES in the step S502), the camera MPU 101 proceeds with the process to step S508. On the other hand, when there is no need of the irradiation with the auxiliary light (NO in the step S502), the process proceeds to step S503.

In the step S503, the camera MPU 101 performs a focus detection operation using signals obtained by a focus detection sensor (not shown) with which the focus detection unit 115 is provided, and calculates a defocusing amount that is focus detection information corresponding to the drive amount of the focus lens. It should be noted that a line sensor, such as a CCD line sensor, consisting of photoelectric conversion elements is used as the focus detection sensor, for example. At this time, the camera MPU 101 appropriately corrects the defocusing amount according to the type of the focus detection method (without auxiliary light, with the LED auxiliary light, or with the flash auxiliary light).

In the next step S504, the camera MPU 101 determines whether the focus lens should be driven (i.e., whether the focus lens is located at an in-focus position) on the basis of the calculated result obtained at the step S503. When the defocusing amount is smaller than a predetermined value, the camera MPU 101 determines that the focus lens is located at the in-focus position. When the focus lens is located at the in-focus position (YES in the step S504), the camera MPU 101 finishes this process. On the other hand, when the focus lens is not located at the in-focus position (NO in the step S504), the camera MPU 101 proceeds with the process to step S505.

In the step S505, the camera MPU 101 determines whether the count of the focus detection operations is more than a predetermined count (n times (n: natural number)). When the count of the focus detection operations is less than the predetermined count (NO in the step S505), the camera MPU 101 proceeds with the process to step S506. In the step S506, the camera MPU 101 gives the drive amount of the focus lens to the lens control unit 114 on the basis of the calculated result in the step S503. Accordingly the focus lens is driven. Then, the camera MPU 101 returns the process to the step S501 in order to determine whether the focus lens reached at the in-focus position.

On the other hand, when the count of the focus detection operations exceeds the predetermined count in the step S505 (YES in the step S505), the camera MPU 101 proceeds with the process to step S507. In the step S507, the camera MPU 101 indicates that the focus detection is impossible on a display unit (not shown) like an LED (a focus detection disabling process), and finishes this process.

When it is determined that the irradiation with the auxiliary light is needed in the above-mentioned step S502, the camera MPU 101 irradiates a subject with the auxiliary light and performs the focus detection in the step S508. The details of the focus detection process using the auxiliary light in the step S508 will be mentioned later. In the following step S509, the camera MPU 101 determines whether the focusing state was able to be detected. When the focusing state was able to be detected (YES in the step S509), the camera MPU 101 proceeds with the process to the step S503. On the other hand, when the focusing state was not able to be detected (NO in the step S509), the process proceeds to step S510. In the step S510, the camera MPU 101 indicates that the focus detection is impossible on the display unit (not shown) like an LED in the same manner as in the step S507, and finishes this process.

Figure 6A:
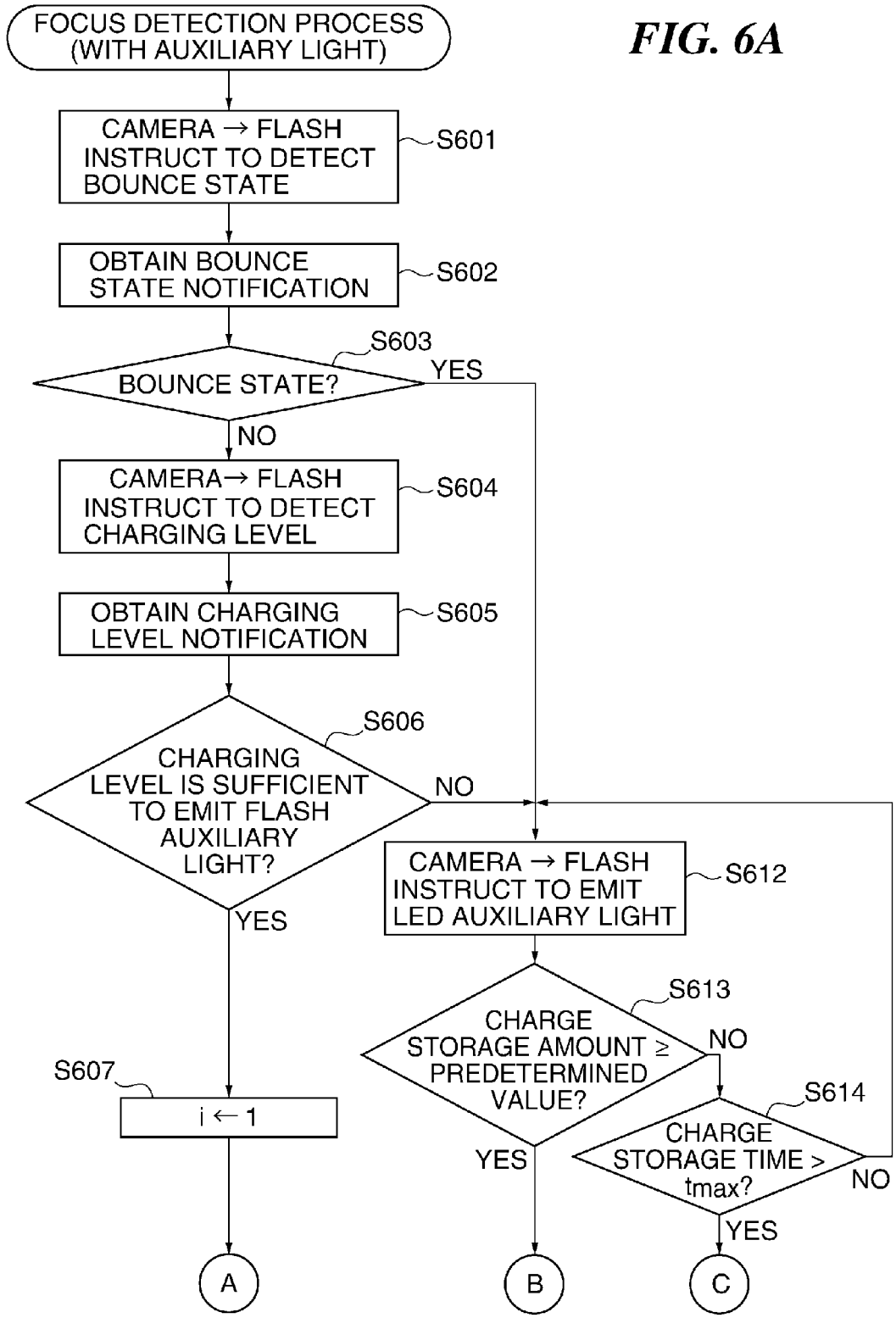
FIG. 6A and FIG. 6B are flowcharts showing a focus detection process with auxiliary light emission executed in the step S508 in FIG. 5.
Figure 6B:
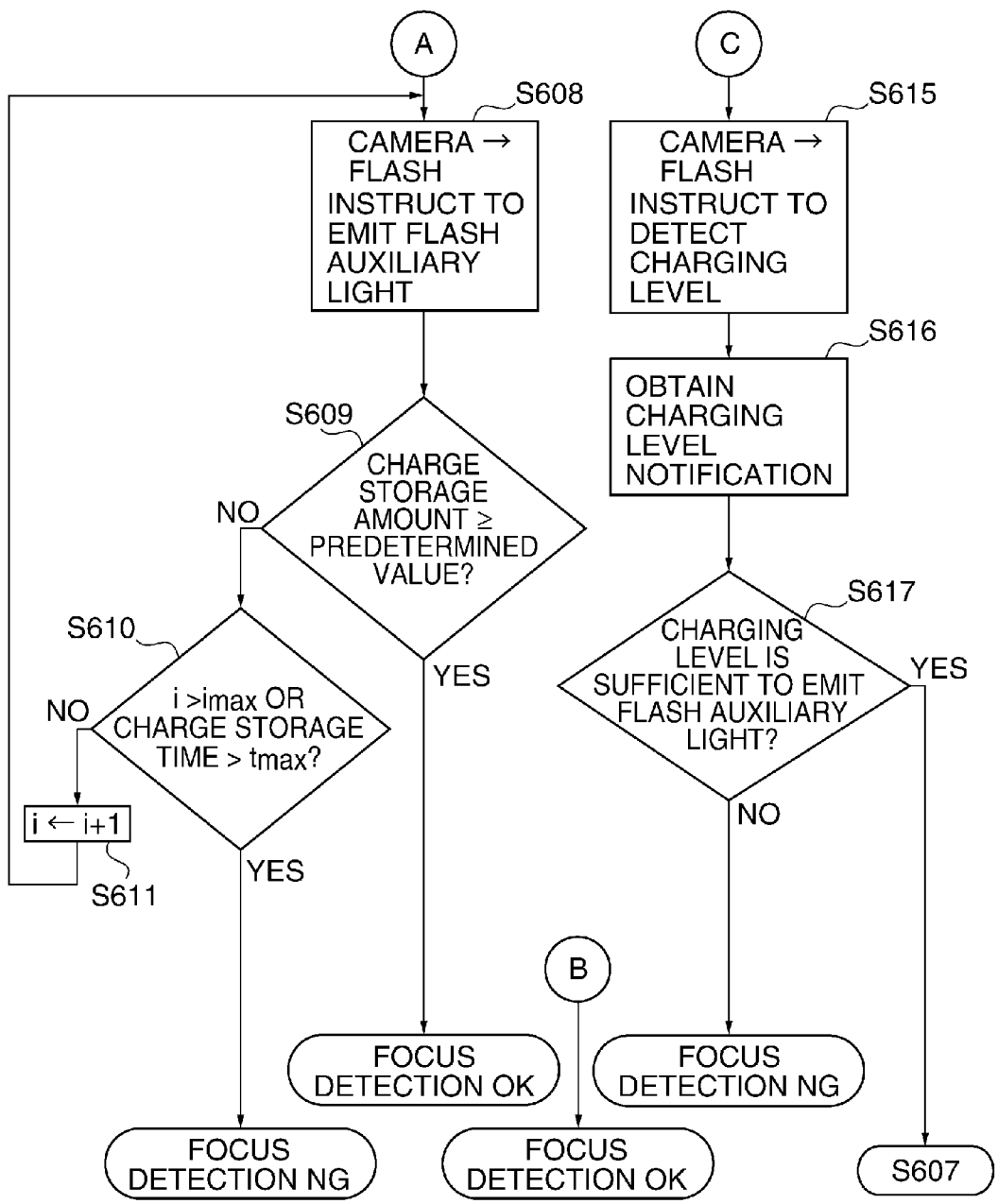

FIG. 6A and FIG. 6B are flowcharts showing the focus detection process with auxiliary light emission executed by the digital still camera 100 in the step S508 in FIG. 5. Each step of the flowcharts shown in FIG. 6A and FIG. 6B is executed because the camera MPU 101 reads a control program from the ROM (not shown), expands it to the RAM (not shown), and controls an action of each part of the digital still camera 100. In this focus detection process, the emission of the flash auxiliary light by the light emitting section 204 of the external flash device 120 and the emission of the LED auxiliary light by the flash-side LED auxiliary light unit 207 of the external flash device 120 are selectively controlled according to the bounce state of the flash head 202, in general.

In the first step S601, the camera MPU 101 instructs the flash MPU 203 of the external flash device 120 to detect the bounce state of the flash head 202 and to notify of the detection result. Then, in step S602, the camera MPU 101 obtains the bounce state notification transmitted from the flash MPU 203 in step S703 in FIG. 7A that will be mentioned later.

In the next step S603, the camera MPU 101 determines whether the flash head 202 is in the bounce state on the basis of the bounce state notification obtained in the step S602. When the flash head 202 is in the bounce state (YES in the step S603), the camera MPU 101 proceeds with the process to step S612, When the flash head 202 is not in the bounce state (NO in the step S603), the process proceeds to step S604.

In the step S604, the camera MPU 101 instructs the flash MPU 203 to detect a charging level of a flash main capacitor and to notify of the result. Accordingly in step S605, the camera MPU 101 obtains a charging level notification about the flash main capacitor transmitted from the flash MPU 203 in step S705 in FIG. 7A that will be described later. In the next step S606, the camera MPU 101 determines whether the charging level is sufficient to emit the flash auxiliary light on the basis of the charging level notification obtained in the step S605. When the charging level is sufficient to emit the flash auxiliary light (YES in the step S606), the camera MPU 101 proceeds with the process to step S607. On the other hand, when the charging level is insufficient to emit the flash auxiliary light (NO in the step S606), the process proceeds to step S612.

The focus detection process with the flash auxiliary light is executed in the steps S607 through S611. That is, the camera MPU 101 sets an initial value (i=1) to a counter (not shown) that stores the number of irradiations of the flash auxiliary light in the step S607. In the next step S608, the camera MPU 101 instructs the flash MPU 203 to emit the flash auxiliary light. When the light emitting section 204 emits the flash auxiliary light in response to this emission instruction, the camera MPU 101 determines whether a charge storage amount of the focus detection sensor with which the focus detection unit 115 is provided is equal to or larger than a predetermined value in step S609. When the charge storage amount is equal to or larger than the predetermined value (YES in the step S609), the camera MPU 101 determines that probability that allows the focus detection operation is high enough (focus detection OK), and finishes the focus detection process. This proceeds with the process to the step S503. When the charge storage amount is less than the predetermined value (NO in the step S609), the camera MPU 101 proceeds with the process to step S610.

In the step S610, the camera MPU 101 determines whether the number of irradiations i reached the maximum number of times $i_{max}$ defined beforehand, and determines whether the charge storage time for the focus detection reached the longest time $t_{max}$ defined beforehand. When the number of irradiations i is larger than the maximum number of times $i_{max}$, or when the charge storage time reached the longest time $t_{max}$ (YES in the step S610), the camera MPU 101 determines that the focus detection is impossible (focus detection NG), and finishes this process. Accordingly, the process proceeds to the step S510. The number of irradiations i is equal to or less than the maximum number of times $i_{max}$, and when the charge storage time does not reach the longest time $t_{max}$ (NO in the step S610), the camera MPU 101 proceeds with the process to step S611. In the step S611, the camera MPU 101 increments the number of irradiations i, and returns the process to the step S608 after that. Accordingly, the irradiation of the field with the flash auxiliary light is repeated, and the focus detection continues.

The focus detection process with the LED auxiliary light is executed in the steps S612 through S614. In the step S612, the camera MPU 101 instructs the flash MPU 203 to emit the LED auxiliary light by the flash-side LED auxiliary light unit 207. When the flash-side LED auxiliary light unit 207 emits the LED auxiliary light in response to the emission instruction, the camera MPU 101 determines whether the charge storage amount of the focus detection sensor during the irradiation with the LED auxiliary light is equal to or larger than the predetermined value in step S613. When the charge storage amount is equal to or larger than the predetermined value (YES in the step S613), the camera MPU 101 determines that probability that allows the focus detection operation is high enough (focus detection OK), and finishes the focus detection process. This proceeds with the process to the step S503. On the other hand, when the charge storage amount is less than the predetermined value (NO in the step S613), the camera MPU 101 proceeds with the process to step S614.

In the step S614, the camera MPU 101 determines whether the charge storage time for the focus detection reached the longest time $t_{max}$. When the charge storage time has not reached the longest time $t_{max}$ (NO in the step S614), the camera MPU 101 returns the process to the step S612, continues the emission of the LED auxiliary light by the flash-side LED auxiliary light unit 207, and continues the focus detection. On the other hand, when the charge storage time reached the longest time $t_{max}$ (YES in the step S614), the camera MPU 101 terminates the emission of the LED auxiliary light by the flash-side LED auxiliary light unit 207, and proceeds with the process to step S615.

The step S615 and step S616 are the same as the steps S604 and S605. In these steps, the camera MPU 101 inquires of the flash MPU 203 the charging level of the flash main capacitor, and obtains its information. Accordingly, a duplicated description here is omitted.

In step S617, the camera MPU 101 determines whether the charging level is sufficient to emit the flash auxiliary light on the basis of the charging level notification obtained in the step S616 in the same manner as the process in the step S606. When the charging level is sufficient to emit the flash auxiliary light (YES in the step S617), the process is returned to the step S607, and accordingly the emission process of the flash auxiliary light is performed. On the other hand, when the charging level is insufficient to emit the flash auxiliary light (NO in the step S617), the camera MPU 101 determines that the focus detection with the flash auxiliary light is impossible (focus detection NG), and finishes this process. Accordingly, the process proceeds to the step S510.

It should be noted that the charging level of the external flash device 120 is detected in the steps S615 through S617 after the emission of the LED auxiliary light in the processing in FIG. 6A and FIG. 6B. And when the emission of the flash auxiliary light is possible, the process is returned to the step S607 in order to perform the focus detection with the flash auxiliary light. This process is performed even if the external flash device 120 is in the bounce state. That is, when the focus detection by the LED auxiliary light is impossible, the focus detection with the flash auxiliary light is tried to explore the possibility of the success of the focus detection.

Figure 7A:
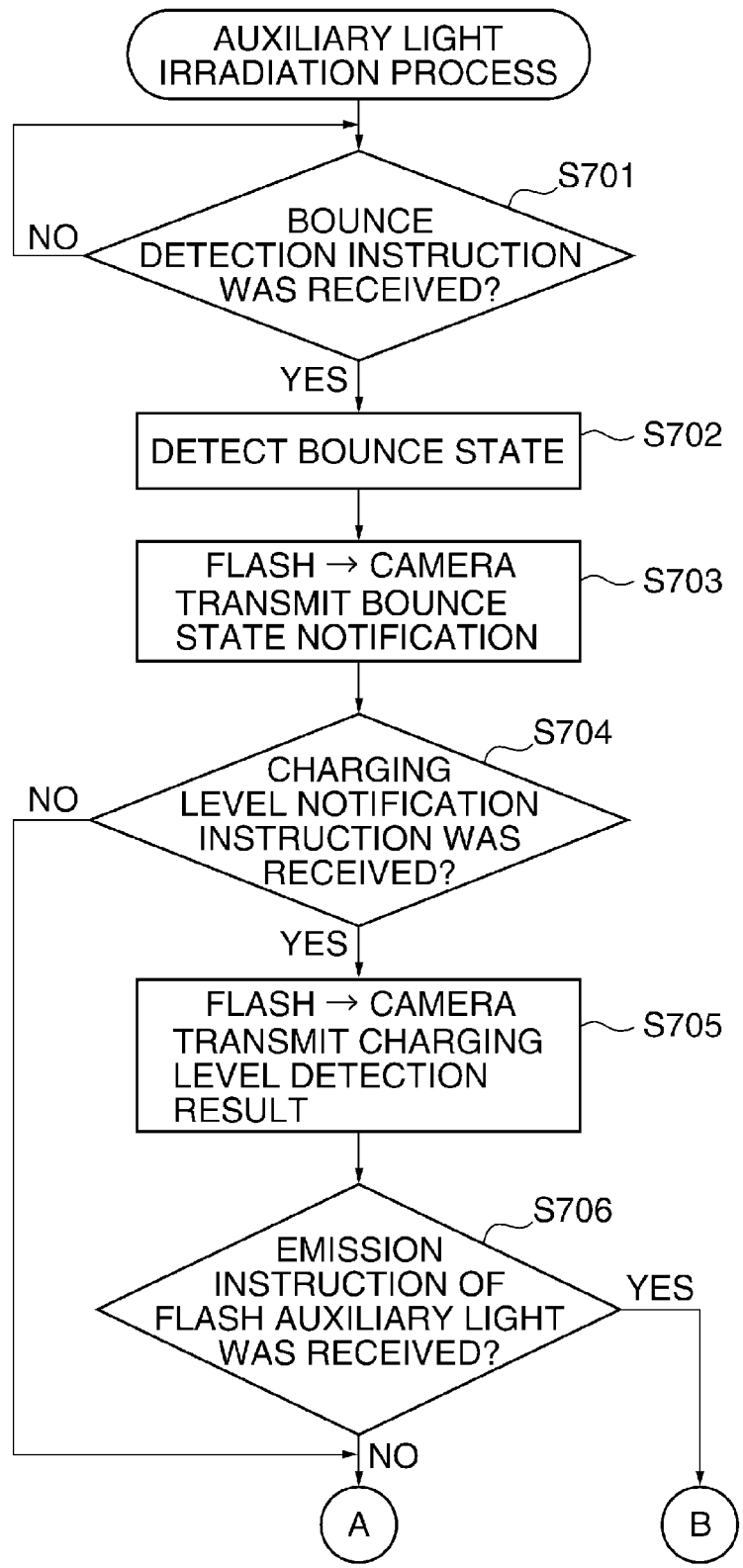
FIG. 7A and FIG. 7B are flowcharts showing an auxiliary light irradiation process that is executed by an external flash device and proceeds in parallel with the focus detection process executed in the step S508 in FIG. 5.
Figure 7B:
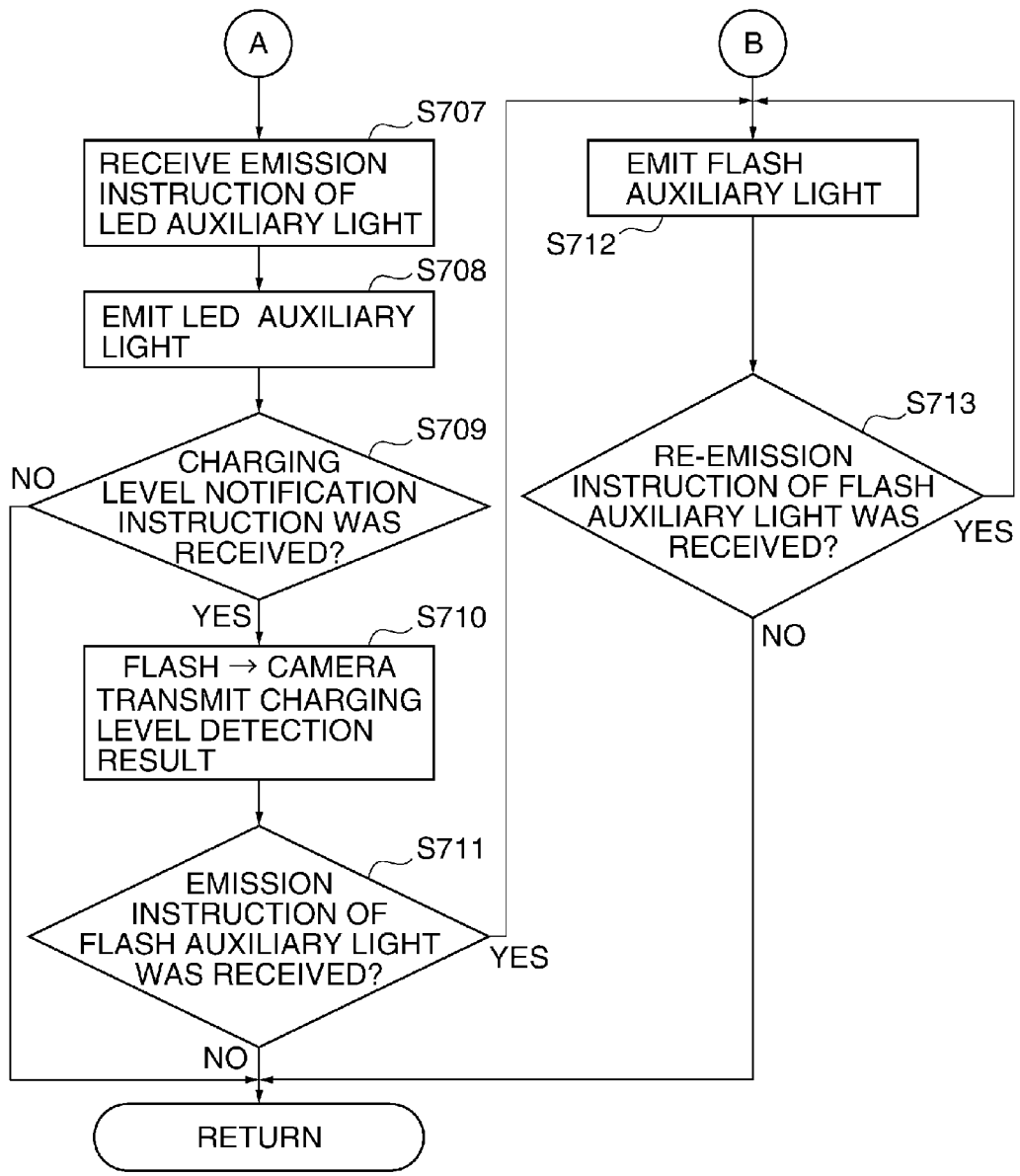

FIG. 7A and FIG. 7B are flowcharts showing an auxiliary light irradiation process that is executed by the external flash device 120 and proceeds in parallel with the focus detection process by the digital still camera 100 in the step S508 in FIG. 5. Each step of the flowchart shown in FIG. 7A and FIG. 7B is executed because the flash MPU 203 reads a control program from a ROM (not shown), expands it to a RAM (not shown), and controls an action of each part of the external flash device 120.

In the step S701, the flash MPU 203 determines whether the bounce detection instruction was received from the camera MPU 101 of the digital still camera 100, and stands by while the bounce detection instruction is not received (NO in the step S701). When receiving the bounce detection instruction (YES in the step S701), the flash MPU 203 proceeds with the process to step S702. In the step S702, the flash MPU 203 determines whether the flash head 202 is in the bounce state with a detection switch (not shown) of the bounce detection unit 205. Next, the flash MPU 203 notifies the camera MPU 101 of the bounce state (transmits the bounce state notification) in step S703.

Next, the flash MPU 203 determines whether the charging level notification instruction was received from the camera MPU 101 in step S704. When receiving the charging level notification instruction (YES in the step S704), the flash MPU 203 proceeds with the process to step S705. When the charging level notification instruction is not received (NO in the step S704), the process proceeds to S707. The case where there is no charging level notification instruction in the step S704 means that the camera MPU 101 controls the emission of the LED auxiliary light in the step S603 and proceeds with the process to the step S612 because the external flash device 120 is in the bounce state.

In the step S705, the flash MPU 203 detects whether the charging level of the flash main capacitor is sufficient to emit the flash auxiliary light, and notifies the camera MPU 101 of the charging level detection result. In step S706, the flash MPU 203 determines whether the emission instruction of the flash auxiliary light was received from the camera MPU 101. When receiving the emission instruction of the flash auxiliary light (YES in the step S706), the flash MPU 203 proceeds with the process to step S712. When the emission instruction of the flash auxiliary light is not received (NO in the step S706), the process proceeds to step S707.

In the step S707, the flash MPU 203 receives the emission instruction of the LED auxiliary light (the emission instruction in the step S612) from the camera MPU 101. When the camera MPU 101 is notified that the external flash device 120 is in the bounce state in the step S703, or when the camera MPU 101 is notified that the charging level is insufficient to emit the flash auxiliary light in the step S705, the flash MPU 203 receives the emission instruction of the LED auxiliary light in the step S707. In these cases, the camera MPU 101 controls the emission of the LED auxiliary light in the step S603, and transmits the emission instruction in the step S612. The flash MPU 203 receives this instruction in the step S707.

In step S708, the flash MPU 203 makes the flash-side LED auxiliary light unit 207 emit to irradiate the field side with the LED auxiliary light. In the next step S709, the flash MPU 203 determines whether the charging level notification instruction was received from the camera MPU 101 like in the step S704. When receiving the charging level notification instruction (YES in the step S709), the flash MPU 203 proceeds with the process to S710. When the charging level notification instruction is not received (NO in the step S709), this process is finished. The case where there is the charging level notification instruction means that the focus detection is not completed with the LED auxiliary light. The case where there is no charging level notification instruction means that the focus detection process is finished because the focus detection is possible with the LED auxiliary light.

In the step S710, the flash MPU 203 detects whether the charging level of the flash main capacitor is sufficient to emit the flash auxiliary light, and notifies the camera MPU 101 of the charging level detection result like in the step S705. Then, in step S711, the flash MPU 203 determines whether the emission instruction of the flash auxiliary light was received from the camera MPU 101 like in the step S706. When receiving the emission instruction of the flash auxiliary light (YES in the step S711), the flash MPU 203 proceeds with the process to S712. When the emission instruction of the flash auxiliary light is not received (NO in the step S711), this process is finished.

The flash MPU 203 makes the light emitting section 204 emit the flash auxiliary light in the step S712. After that, the flash MPU 203 again determines whether a re-emission instruction of the flash auxiliary light was received from the camera MPU 101 in step S713. When receiving the re-emission instruction of the flash auxiliary light (YES in the step S713), the flash MPU 203 returns the process to the step S712. When the re-emission instruction of the flash auxiliary light is not received (NO in the step S713), this process is finished.

According to the above-mentioned control method, since the auxiliary light used for the focus detection is changed to the LED auxiliary light from the flash auxiliary light when the external flash device 120 is in the bounce state, the power consumption is reduced and the release delay is reduced. Although the light emitting section 204 of the external flash device 120 is used as the light source of the flash auxiliary light in the above-mentioned control method, the built-in flash device 119 of the digital still camera 100 may be used. Moreover, although the flash-side LED auxiliary light unit 207 of the external flash device 120 is used as the light source of the LED auxiliary light, the camera LED auxiliary light unit 121 of the digital still camera 100 may be used.

Next, a second embodiment of the present invention will be described. An image pickup system in the second embodiment consists of the digital still camera 100 (see FIG. 1) described in the first embodiment and an external flash device 130 that is an external light emission device shown in FIG. 8. Accordingly, the description about the block configuration of the digital still camera 100 is omitted.

Figure 8:
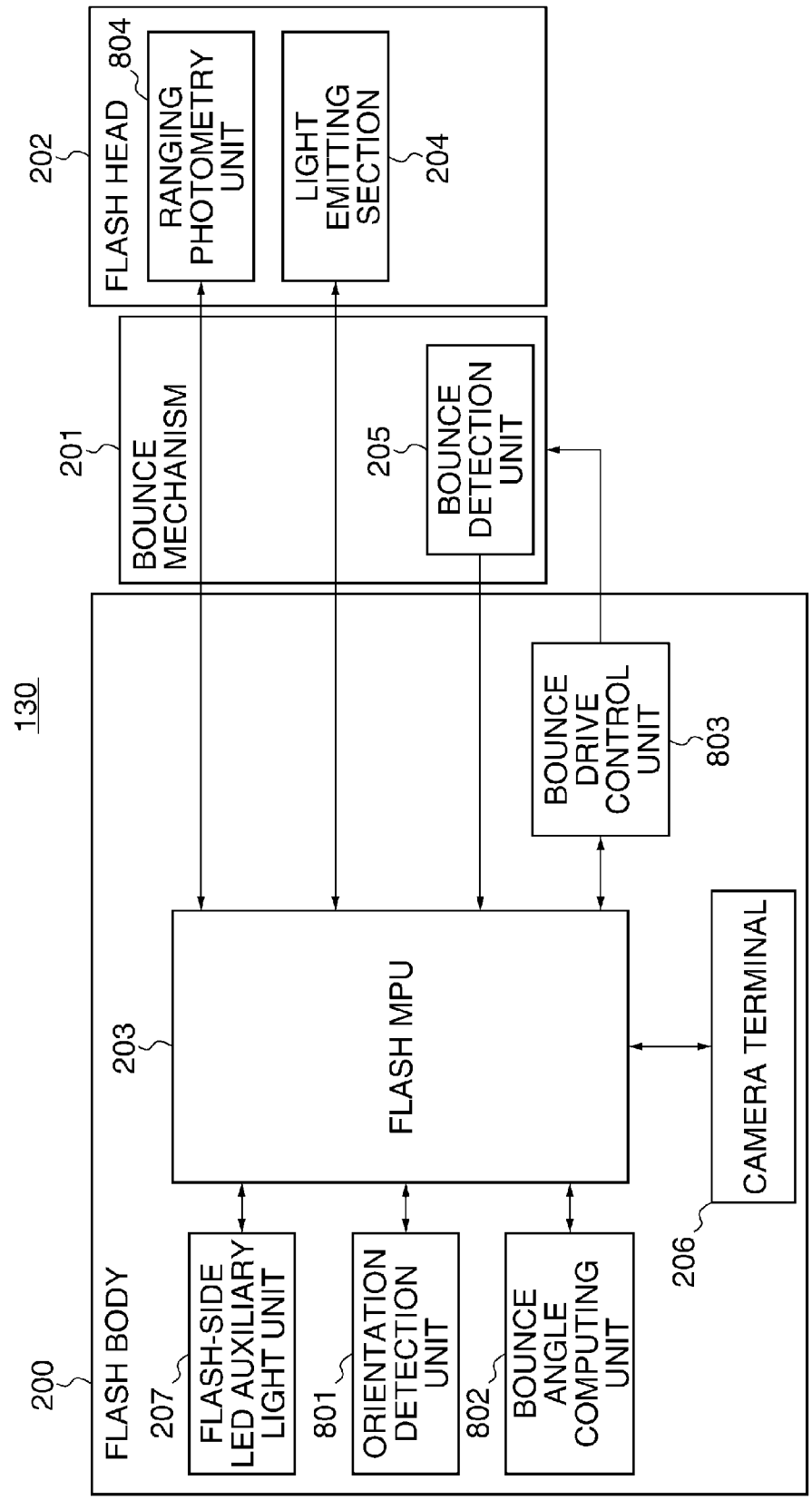
FIG. 8 is a block diagram schematically showing a configuration of an external flash device that constitutes an image pickup system according to a second embodiment and is freely detached and attached to the digital still camera in FIG. 1.
Figure 9A:
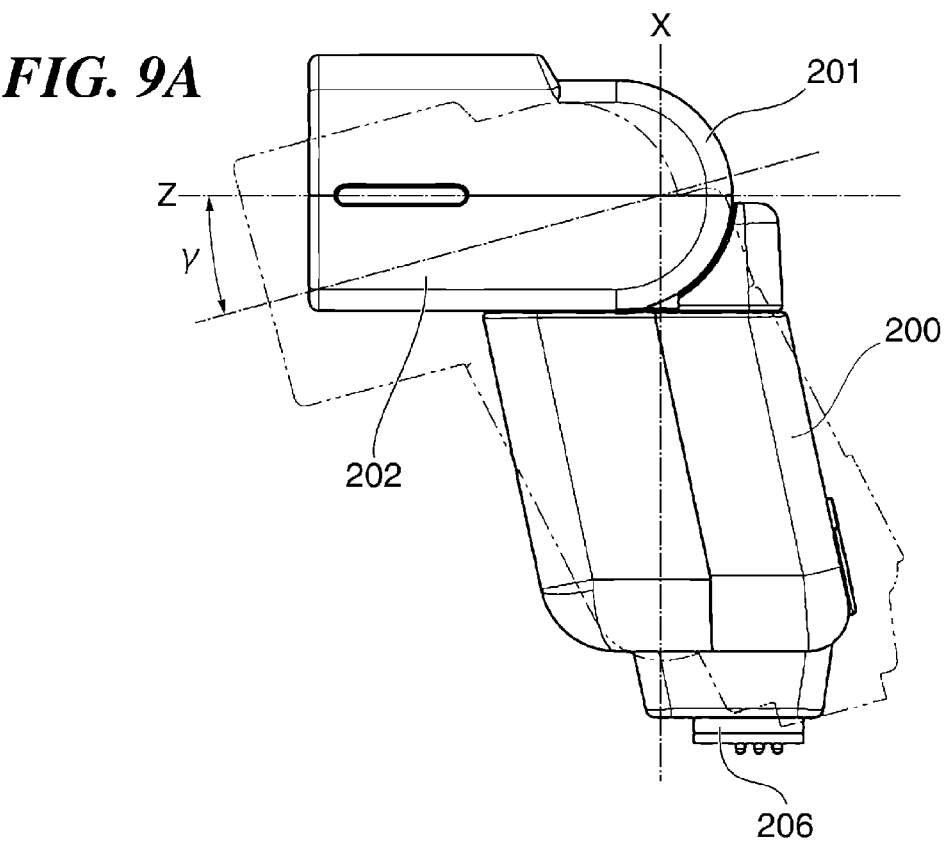
FIG. 9A and FIG. 9B are external views (two-side views) schematically showing a configuration of the external flash device in FIG. 8.
Figure 9B:
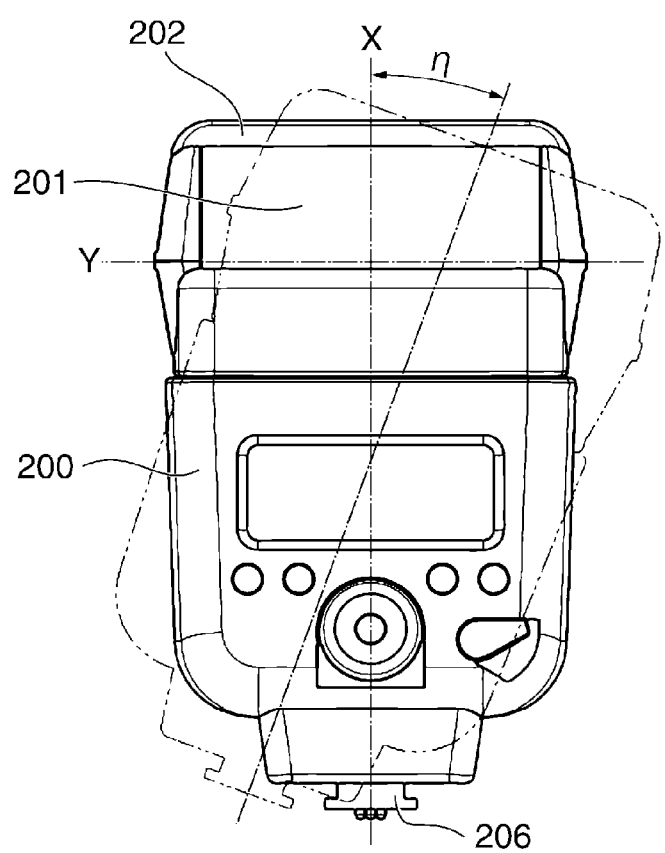

FIG. 8 is a block diagram schematically showing the configuration of the external flash device 130. It should be noted that the external appearance of the external flash device 130 is the same as the external flash device 120 described in the first embodiment shown in FIG. 3A, FIG. 3B, and FIG. 3C. In the second embodiment, the external views shown in FIG. 9A and FIG. 9B are further referred. FIG. 9A and FIG. 9B are external views (two-side views) of the external flash device 130. FIG. 9A is a side view and FIG. 9B is a back view.

In FIG. 8, the members of the external flash device 130 that are the same as the members of the external flash device 120 are indicated by the same reference numbers and the descriptions therefor are omitted. Also in FIG. 9A and FIG. 9B, the members of the external flash device 130 that are the same as the members of the external flash device 120 are indicated by the same reference numbers.

The external flash device 130 has a configuration that enables an auto bounce drive control by a well-known method, such as the method disclosed in Japanese Laid-Open Patent Publication (Kokai) No. H04-340527 (JP H04-340527A), in addition to the configuration of the external flash device 120. Specifically, the flash body 200 of the external flash device 130 is further provided with an orientation detection unit 801, a bounce angle computing unit 802, and a bounce drive control unit 803 in order to enable execution of the auto bounce drive control. Moreover, the flash head 202 of the external flash device 130 is further provided with a ranging photometry unit 804. The flash MPU 203 performs a system control, such as angle determination of the flash head 202 in addition to the emission control sequence, according to such a configuration.

The ranging photometry unit 804 is provided with a ranging photometry sensor for receiving flash light that is emitted from the light emitting section 204 and is reflected by a ranging object, and outputs a signal showing a light receiving result to the flash MPU 203. This ranging photometry sensor is arranged at a position where the flash light that is emitted from the light emitting section 204 and is reflected by the ranging object is received so that an orientation of a light receiving surface is almost identical to the irradiation direction of the flash light from the light emitting section 204. The flash MPU 203 converts the obtained luminance signal into a digital signal with an A/D converter (not shown), and calculates the distance according to the converted digital signal. Moreover, the ranging photometry unit 804 measures the distance to a reflective surface, such as a ceiling, and the distance to a subject in a well-known auto bounce drive control. For example, a standard reflectance of the reflective surface like a ceiling and a standard reflectance of an assumed subject are determined beforehand, and a distance is calculated on the basis of a luminance signal obtained by irradiating a ranging object with the flash light with a predetermined emission amount. Alternatively, the distance to the reflective surface like a ceiling and the distance to the subject may be measured by the method disclosed in JP H04-340527A.

The bounce drive control unit 803 drives the flash head 202 horizontally and vertically with respect to the flash body 200 by controlling a motor included in the bounce drive control unit 803 according to a control signal from the flash MPU 203. The bounce detection unit 205 detects a current horizontal bounce angle $\theta A$ (a current angle) and a vertical bounce angle $\theta_B$ (a current angle) when the bounce drive control unit 803 performs the bounce drive of the flash head 202, and outputs them to the flash MPU 203 as a relative position to the flash body 200.

The orientation detection unit 801 obtains an inclination $\gamma$ of the flash body 200 with respect to a Z-axis and an inclination $\eta$ with respect to the X-axis based on the level position of the digital still camera 100, as shown in FIG. 9A and FIG. 9B.

The bounce angle computing unit 802 calculates the optimal bounce angle on the basis of the data obtained by the ranging photometry unit 804 and the data obtained by the orientation detection unit 801.

Figure 10A:
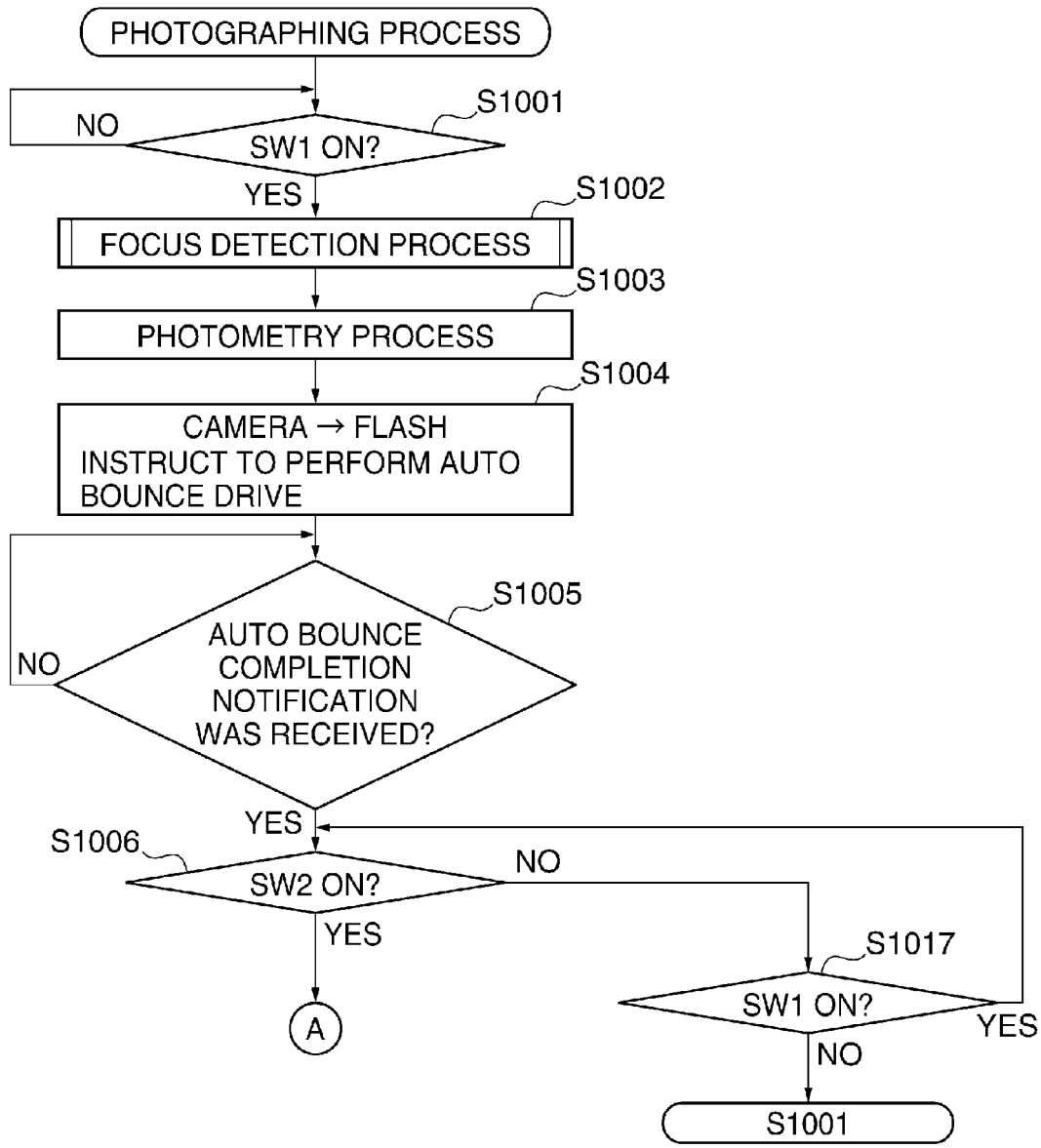
FIG. 10A and FIG. 10B are flowcharts showing a photographing process by the digital still camera in the image pickup system according to the second embodiment.
Figure 10B:
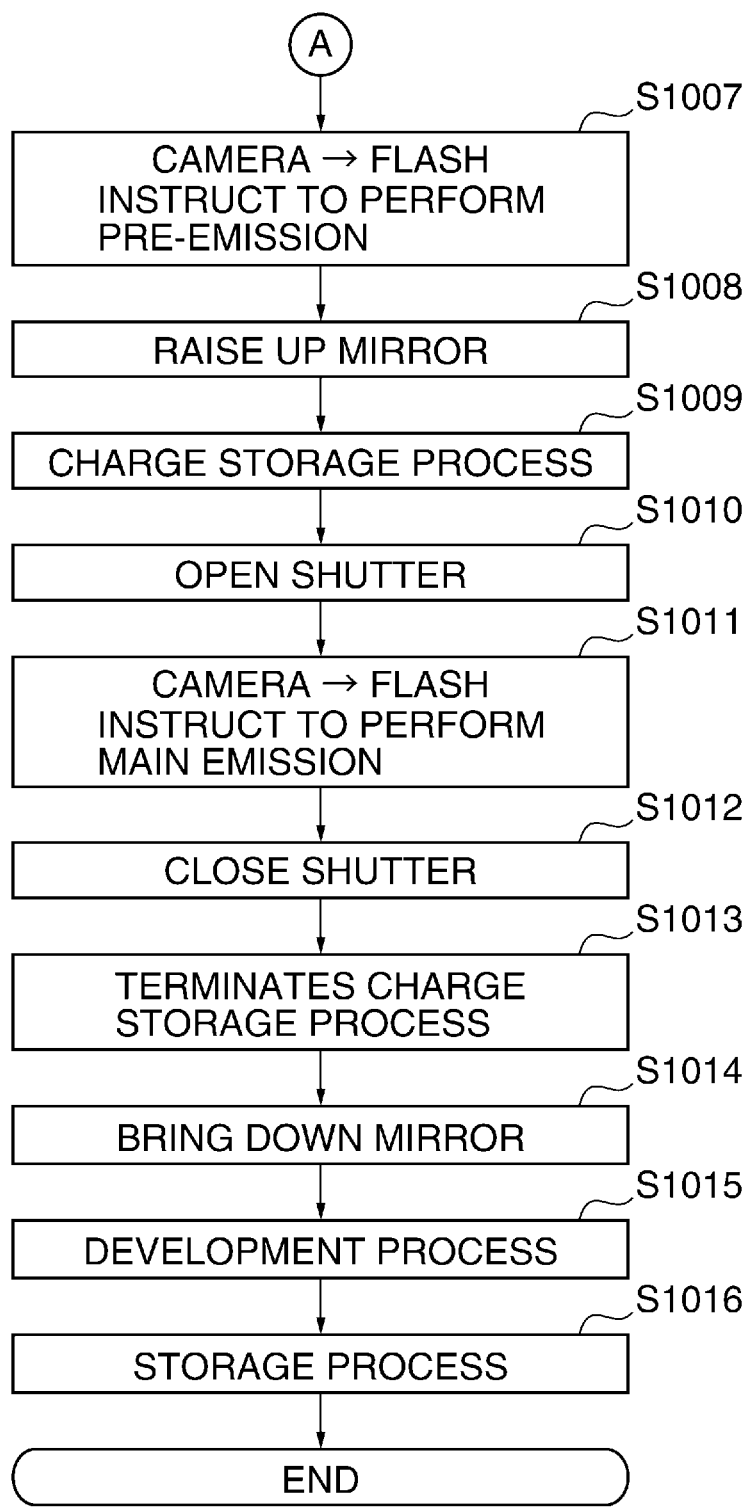

FIG. 10A and FIG. 10B are flowcharts showing a photographing process by the digital still camera 100 in the image pickup system according to the second embodiment. The process in FIG. 10A and FIG. 10B is configured to insert steps S1004 and S1005 between the steps S403 and S404 in the flowchart in FIG. 4. Steps S1001, S1002, S1003, S1006, and S1017 shown in the flowchart in FIG. 10A are the same as the steps S401, S402, S403, S404, and S415 shown in the flowchart in FIG. 4, respectively, and the descriptions about these processes are omitted. Each step of the flowchart shown in FIG. 10A and FIG. 10B is executed because the camera MPU 101 reads a control program from the ROM (not shown), expands it to the RAM (not shown), and controls an action of each part of the digital still camera 100. Furthermore, it is executed because the camera MPU 101 reads a control program from the ROM (not shown), expands it to the RAM (not shown), and instructs the external flash device 130 about a predetermined action.

In the step S1004, the camera MPU 101 instructs the external flash device 130 to perform the auto bounce drive. In the next step S1005, the camera MPU 101 determines whether an auto bounce completion notification was received from the external flash device 130. The camera MPU 101 stands by while the auto bounce completion notification is not received (NO in the step S1005), and proceeds with the process to the step S1006 when the auto bounce completion notification was received (YES in the step S1005).

The focus detection process is performed in the step S1002 in the flowchart shown in FIG. 10A, and thereby the process equivalent to the process shown in the flowchart in FIG. 5 described in the first embodiment is performed. Accordingly, the image pickup system according to the second embodiment that enables to execute the auto bounce drive control of the external flash device 130 also performs the focus detection process using the auxiliary light in the step S508 in the flowchart in FIG. 5. Next, the focus detection process using the auxiliary light in the second embodiment will be described with reference to FIG. 11 through FIG. 15.

Figure 11:
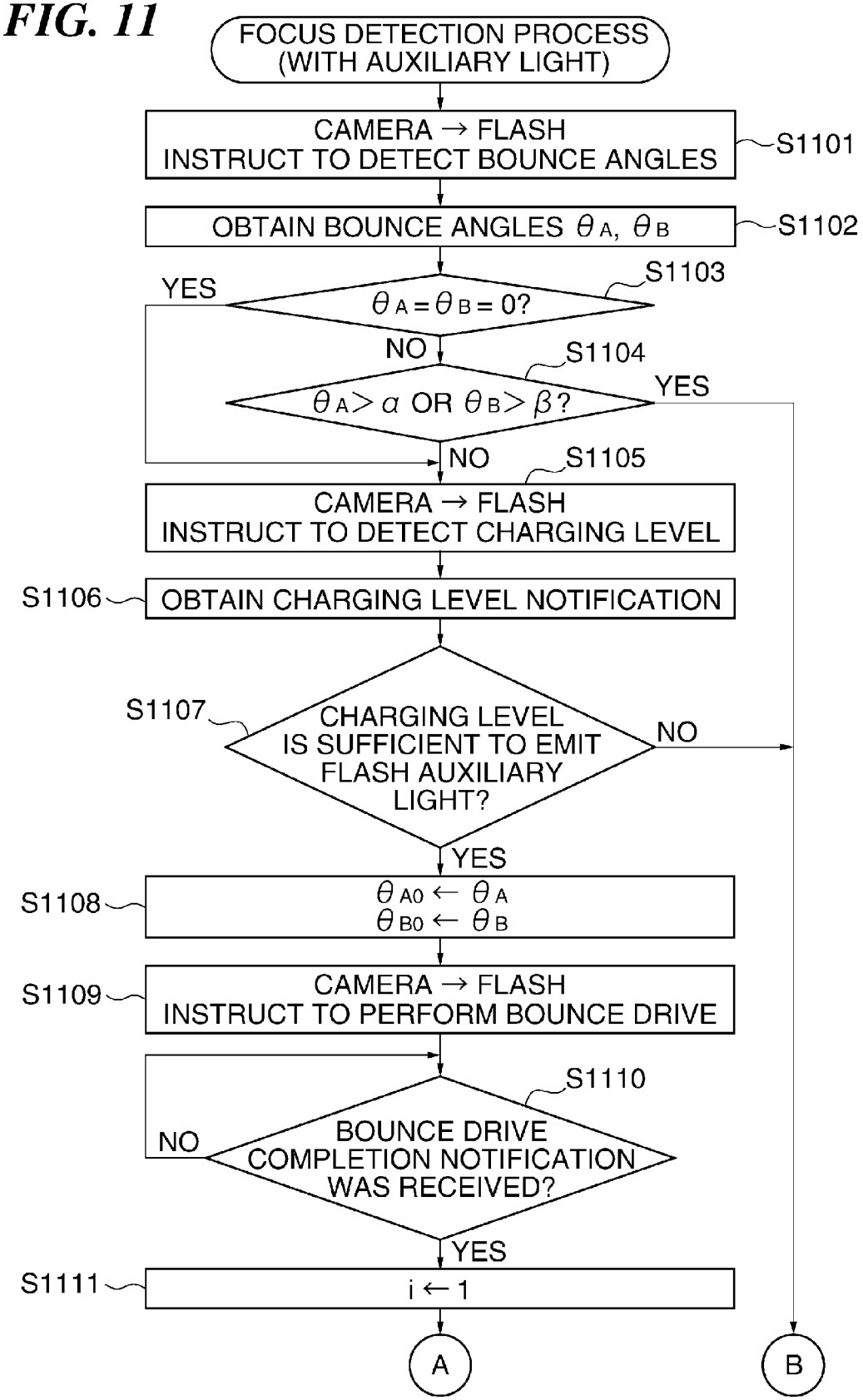
FIG. 11 is a flowchart showing a part of a focus detection process with auxiliary light emission executed by the digital still camera in the step S508 in FIG. 5 by executing the step S1002 in FIG. 10A.
Figure 12A:
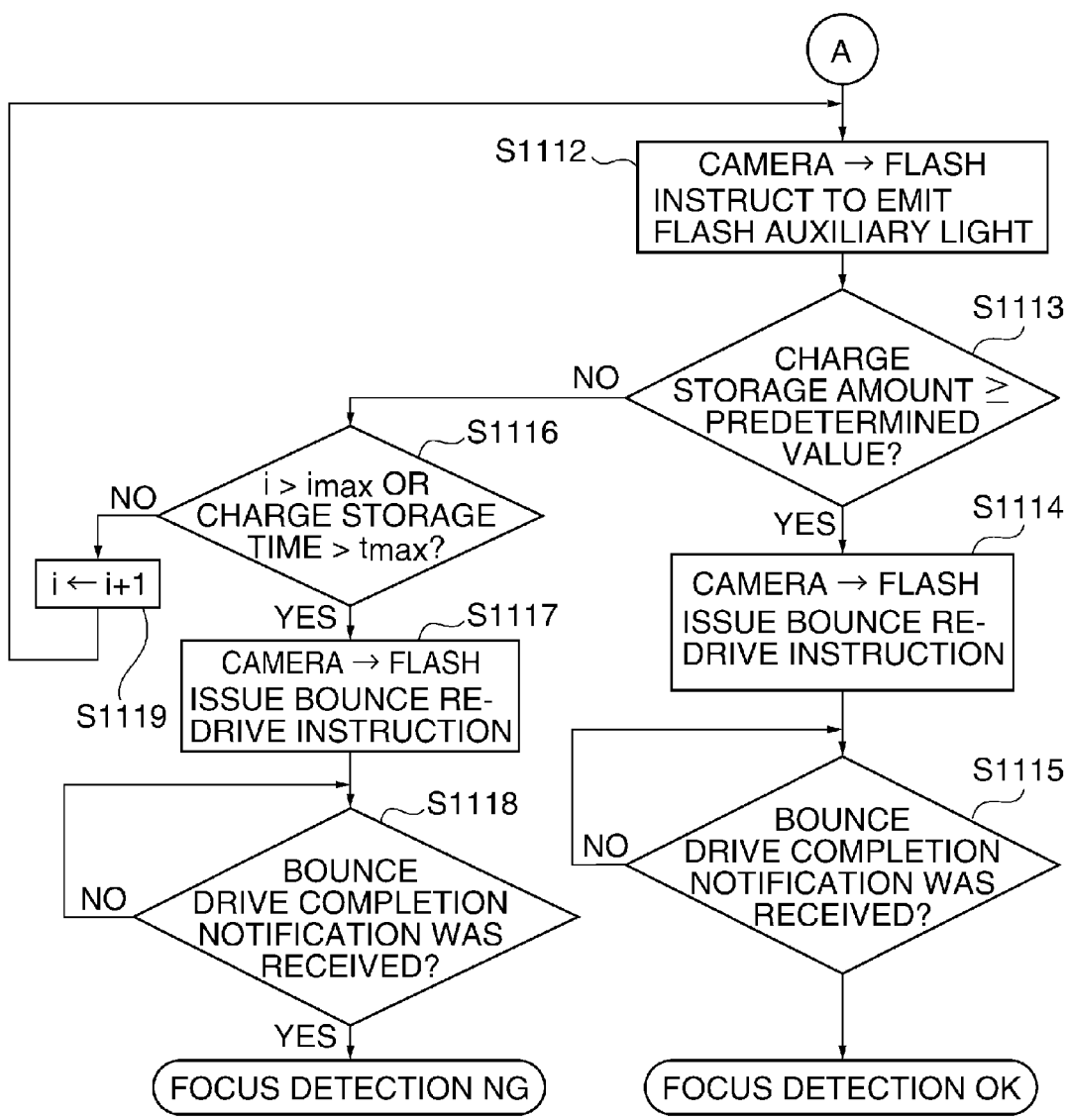
FIG. 12A and FIG. 12B are flowcharts showing the remaining part of the focus detection process with auxiliary light emission executed by the digital still camera in the step S508 in FIG. 5 by executing the step S1002 in FIG. 10A.
Figure 12B:
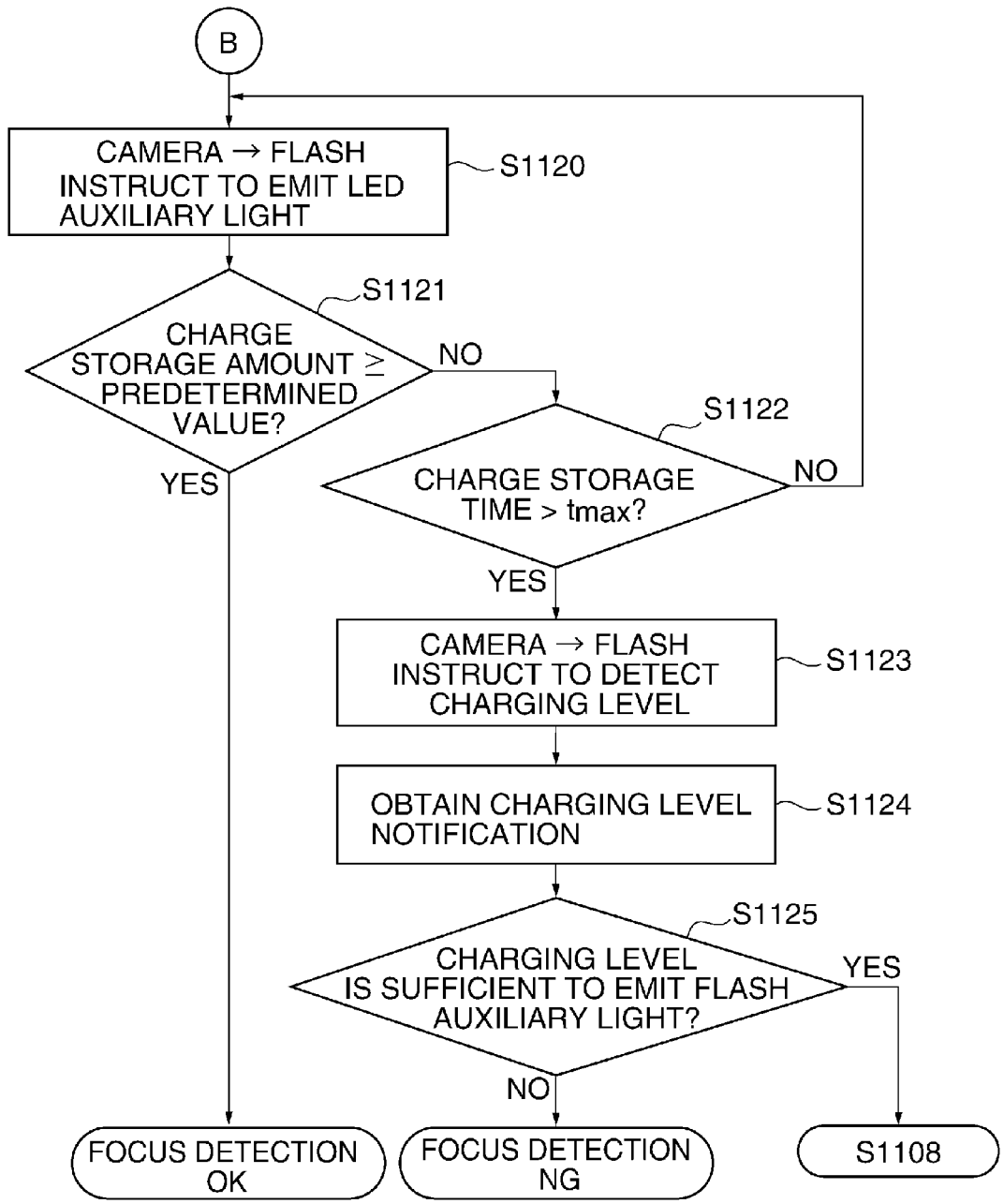

FIG. 11, FIG. 12A, and FIG. 12B are flowcharts showing the focus detection process with auxiliary light emission executed by the digital still camera 100 in the step S508 in FIG. 5 by executing the step S1002 in FIG. 10A. Each step of the flowchart shown in FIG. 11, FIG. 12A, and FIG. 12B is executed because the camera MPU 101 reads a control program from the ROM (not shown), expands it to the RAM (not shown), and controls an action of each part of the digital still camera 100.

In step S1101, the camera MPU 101 instructs the flash MPU 203 of the external flash device 130 to detect the bounce angles. The detection results of the bounce angles are transmitted to the camera MPU 101 from the flash MPU 203 in response to this detection instruction of the bounce angles. Accordingly, in step S1102, the camera MPU 101 obtains the horizontal bounce angle θA and the vertical bounce angle $\theta_B$ of the flash head 202 of the external flash device 130.

In the next step S1103, the camera MPU 101 determines whether the bounce angles $\theta_A$ and $\theta_B$ are equal to zero (i.e., whether the flash head 202 is in a normal position). When the bounce angles $\theta_A$ and $\theta_B$ are equal to zero ($\theta_A=\theta_B=0$, YES in the step S1103), the camera MPU 101 proceeds with the process to the step S1105. When the bounce angles $\theta_A$ and $\theta_B$ are not equal to zero (NO in the step S1103), the process proceeds to the step S1104.

In the step S1104, the camera MPU 101 determines whether each of the bounce angles $\theta_A$ and $\theta_B$ obtained in the step S1102 is equal to or smaller than a predetermined angle. Specifically, the camera MPU 101 determines whether the bounce angle $\theta_A$ is larger than a predetermined horizontal bounce threshold angle α ($\theta_A>\alpha$) or the bounce angle $\theta_B$ is larger than a predetermined vertical bounce threshold angle β ($\theta_B>\beta$). When the bounce angle $\theta_A$ is larger than the angle α or the bounce angle $\theta_B$ is larger than the angle β ($\theta_A>\alpha$ or $\theta_B>\beta$, YES in the step S1104), the camera MPU 101 proceeds with the process to step S1120 in FIG. 12B. When the bounce angle $\theta_A$ is equal to or smaller than the angle α and the bounce angle $\theta_B$ is equal to or smaller than the angle β ($\theta_A$ α and $\theta_B$ β, NO in the step S1104), the process proceeds to the step S1105.

When the focus detection with the emission of the flash auxiliary light, it is necessary to turn the flash head 202 of the external flash device 130 to a subject. Accordingly, when the flash head 202 is turned to the ceiling side by the auto bounce control, it is necessary to return the flash head 202 to the normal position once for performing the focus detection and to returns to the position by the auto bounce control again for photographing. Accordingly, a release control will be delayed when the bounce angle by the auto bounce control is too large. Accordingly, the bounce threshold angles α and β used in the step S1104 are defined so that the release control is not delayed significantly due to the bounce drive for returning the flash head 202 to the normal position and for turning it to the ceiling side again. For example, the bounce threshold angles α and β are set to 30 degrees. In such a case, when both the bounce angles $\theta_A$ and $\theta_B$ are equal to or smaller than 30 degrees, the bounce drive control in a subroutine shown in FIG. 13B mentioned later is performed, and the focus detection with the emission of the flash auxiliary light is performed in step S1112. On the other hand, when at least one of the bounce angles $\theta_A$ and $\theta_B$ is larger than 30 degrees and the flash head 202 is far from the normal position, the focus detection with the emission of the LED auxiliary light is performed previously in step S1120 mentioned later. Thus, since the delay of the release control is reduced by reducing the bounce drive operation as much as possible, the photographing operation with excellent usability becomes possible.

A process in steps S1105 through S1107 is the same as that in the steps S604 through S606 in FIG. 6A. That is, the camera MPU 101 instructs the external flash device 130 to detect the charging level of the flash main capacitor and to notify of the result (step S1105). As the result, the camera MPU 101 obtains the charging level notification transmitted from the flash MPU 203 (step S1106), and determines whether the charging level is sufficient to emit the flash auxiliary light (step S1107). When the charging level is sufficient to emit the flash auxiliary light (YES in the step S1107), the camera MPU 101 proceeds with the process to step S1108. On the other hand, when the charging level is insufficient to emit the flash auxiliary light (NO in the step S1107), the process proceeds to step S1120.

In the step S1108, the camera MPU 101 temporarily stores the bounce angles $\theta_A$ and $\theta_B$ obtained in the step S1102 to the buffer memory 106 through the memory controller 105 as pre-bounce-drive bounce angles $\theta_{A0}$ and $\theta_{B0}$, respectively. In the following step S1109, the camera MPU 101 instructs the flash MPU 203 to perform the bounce drive for turning the flash head 202 to the normal position. At this time, the camera MPU 101 instructs the flash MPU 203 by setting both a horizontal target bounce angle $\theta_X$ and a vertical target bounce angle $\theta_Y$ to 0 degrees, respectively. When receiving the instruction in the step S1109, the flash MPU 203 changes the horizontal and vertical irradiation directions of the flash head 202 by driving motors, which is a well-known method, in step S1312 in the subroutine in FIG. 13B mentioned later.

In the next step S1110, the camera MPU 101 determines whether a bounce drive completion notification was received from the external flash device 203. The camera MPU 101 stands by while the bounce drive completion notification is not received (NO in the step S1110), and proceeds with the process to the step S1111 when the bounce drive completion notification was received (YES in the step S1110).

Since the process from step S1111 to step S1113 is equivalent to the process from the step S607 in FIG. 6A to the step S609 in FIG. 6B, the detailed description is omitted. Although the first embodiment finishes the process when the determination in the step S609 is "YES", the second embodiment performs a different process when the determination in the step S1113 corresponding to the step S609 is "YES". That is, when the charge storage amount of the focus detection sensor exceeds the predetermined value after the emission of the flash auxiliary light (step S1112) and when the determination in the step S1113 becomes "YES", the probability that allows the focus detection operation is high enough. Accordingly, the camera MPU 101 terminates the emission of the flash auxiliary light, and proceeds with the process to step S1114.

In the step S1114, the camera MPU 101 issues a bounce re-drive instruction to the flash MPU 203 so that the flash head 202 returns to the original bounce state notified in the step S1102. Specifically, in step S1114, the camera MPU 101 invokes the bounce angles $\theta_{A0}$ and $\theta_{B0}$ that were stored temporarily to the buffer memory 106 in the step S1108. Then, the camera MPU 101 transmits a bounce drive instruction to the flash MPU 203 by setting the target bounce angles $\theta_X$ and $\theta_Y$ to $\theta_{A0}$ and $\theta_{B0}$, respectively. Accordingly, the flash MPU 203 performs the bounce drive. Then, in the step S1115, the camera MPU 101 determines whether a bounce drive completion notification was received from the external flash device 203. The camera MPU 101 stands by while the bounce drive completion notification is not received (NO in the step S1115), and finishes this process with the determination of the focus detection OK when the bounce drive completion notification was received (YES in the step S1115).

Since the process in steps S1116 and S1119 is equivalent to the process in the steps S610 and S611 in FIG. 6B, the detailed description is omitted. However, in the second embodiment, when the determination in the step S1116 is "YES" (i.e., when the camera MPU 101 determines that the focus detection is impossible (focus detection NG)), the camera MPU 101 proceeds with the process to step S1118.

The process in the step S1118 and the following step S1119 is the same as that in the steps S1114 and S1115, and is the process for returning the external flash device 130 to the original bounce angles (i.e., the target bounce angles $\theta_X$ and $\theta_Y$ are set to $\theta_{A0}$ and $\theta_{B0}$, respectively). When receiving the bounce drive completion notification (YES in the step S1119), the camera MPU 101 finishes this process with the determination of the focus detection NG. Accordingly the process proceeds to the step S510 in FIG. 5.

When the determination in the step S1104 is "YES", or when the determination in the step S1107 is "NO", the process proceeds to the step S1120 as mentioned above. Since the process from step S1111 to step S1113 is equivalent to the process from the step S612 in FIG. 6A to the step S617 in FIG. 6B, the detailed description is omitted.

Figure 13A:
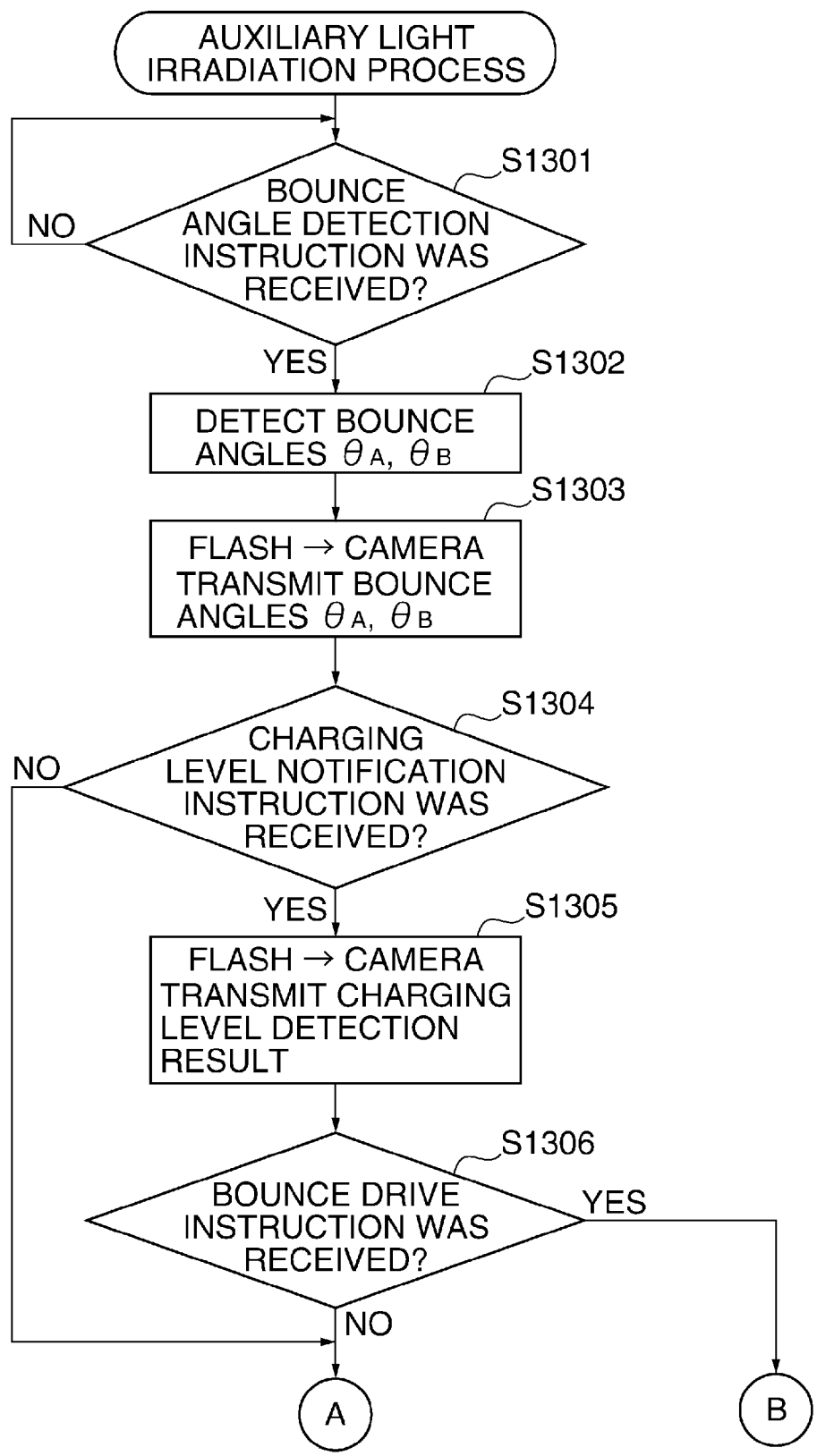
FIG. 13A and FIG. 13B are flowcharts showing an auxiliary light irradiation process that is executed by the external flash device and proceeds in parallel with the focus detection process with auxiliary light emission executed in the step S508 in FIG. 5 by executing the step S1002 in FIG. 10A.
Figure 13B:
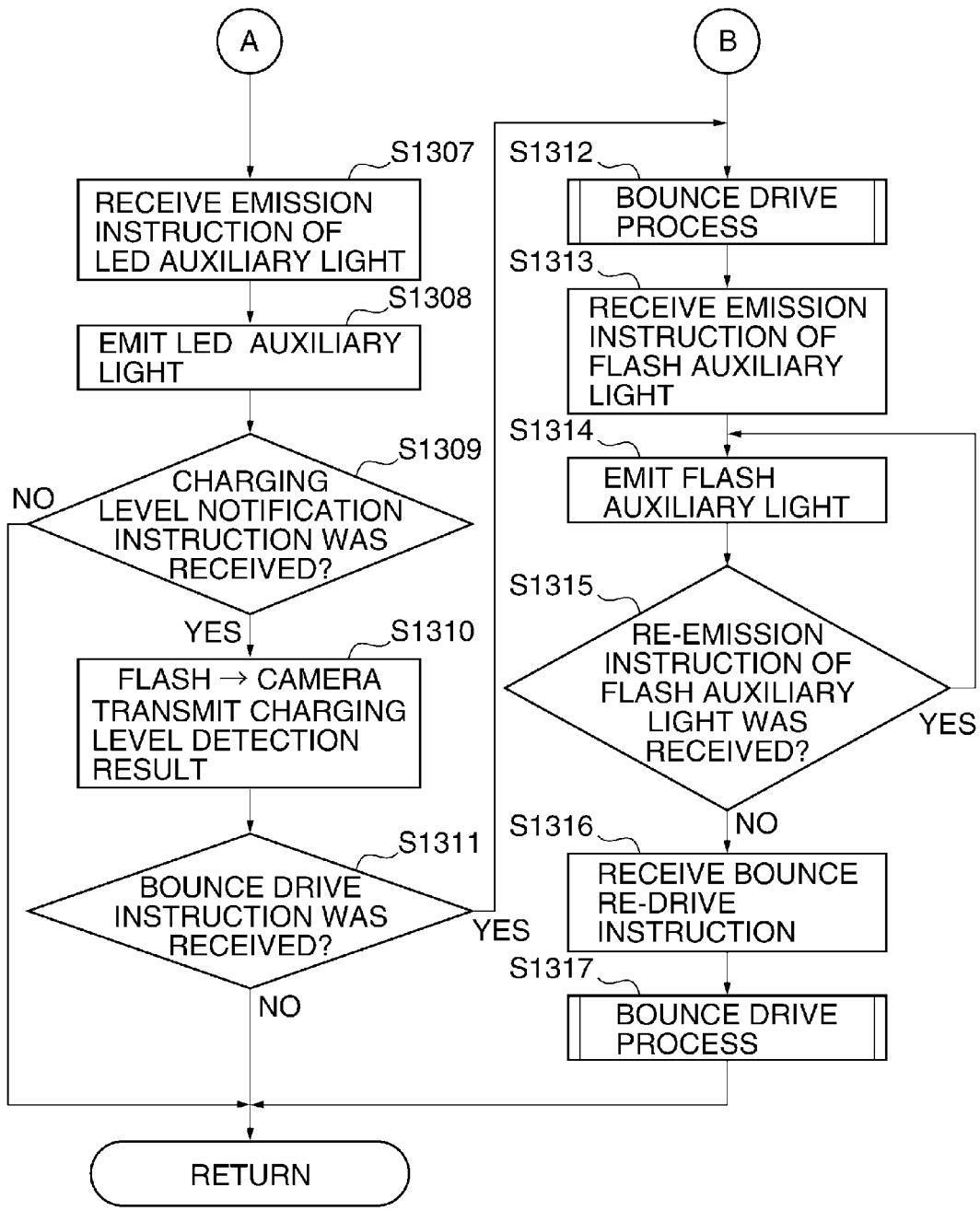

FIG. 13A and FIG. 13B are flowcharts showing an auxiliary light irradiation process that is executed by the external flash device 130 and proceeds in parallel with the focus detection process with auxiliary light emission executed in the step S508 in FIG. 5 by executing the step S1002 in FIG. 10A. Each step of the flowchart shown in FIG. 13A and FIG. 13B is executed because the flash MPU 203 reads a control program from the ROM (not shown), expands it to the RAM (not shown), and controls an action of each part of the external flash device 130.

In the step S1301, the flash MPU 203 determines whether a bounce angle detection instruction (the instruction in the step S1101) was received from the camera MPU 101. The flash MPU 203 stands by while the bounce angle detection instruction is not received (NO in the step S1301), and proceeds with the process to the step S1302 when the bounce angle detection instruction was received (YES in the step S1301). In the step S1302, the flash MPU 203 detects the horizontal bounce angle $\theta_A$ and the vertical bounce angle $\theta_B$ by the rotation angle detection sensor (not shown) of the bounce detection unit 205. Then, in step S1303, the flash MPU 203 notifies the camera MPU 101 of the bounce angles $\theta_A$ and $\theta_B$ that were detected in the step S1302.

Next, the flash MPU 203 determines whether the charging level notification instruction (the instruction in the step S1105) was received from the camera MPU 101 in step S1304. When receiving the charging level notification instruction (YES in the step S1304), the flash MPU 203 proceeds with the process to step S1305. When the charging level notification instruction is not received (NO in the step S1304), the process proceeds to S1307. The case where there is no charging level notification instruction in the step S1304 is a case where the bounce angles of the flash head 202 that were obtained by the camera MPU 101 satisfy the conditions $\theta_A > \alpha$ or $\theta_B > \beta$. That is, it is a case where the determination in the step S1104 in FIG. 11 is "YES" and the camera MPU 101 proceeds with the process to the step S1120 to emit the LED auxiliary light previously.

In the step S1305, the flash MPU 203 detects the charging level of the flash main capacitor and notifies the camera MPU 101 of the detection result. In the following step S1306, the flash MPU 203 determines whether the bounce drive instruction (the instruction in the step S1109) was received from the camera MPU 101. When receiving the bounce drive instruction (YES in the step S1306), the flash MPU 203 proceeds with the process to step S1312. When the bounce drive instruction is not received (NO in the step S1306), the process proceeds to S1307. It should be noted that the flash MPU 203 obtains the target bounce angles $\theta_X$ and $\theta_Y$ ($\theta_X = \theta_Y = 0$) that are transmitted from the camera MPU 101 in the step S1109 when the bounce drive instruction is received.

A process in steps S1307 through S1310 is the same as that in the steps S707 through S710 in FIG. 7B. That is, the flash MPU 203 receives the emission instruction of the LED auxiliary light (the emission instruction in the step S1120) from the camera MPU 101 in the step S707. According to this instruction, the flash MPU 203 makes the flash-side LED auxiliary light unit 207 emit to irradiate the field side with the LED auxiliary light in step S1308. In the next step S1309, the flash MPU 203 determines whether the charging level notification instruction (the instruction in the step S1123) was received from the camera MPU 101 like in the step S1304. When receiving the charging level notification instruction (YES in the step S1309), the flash MPU 203 proceeds with the process to S1310. When the charging level notification instruction is not received (NO in the step S1309), this process is finished. In the step S1310, the flash MPU 203 detects the charging level of the flash main capacitor, and notifies the camera MPU 101 of the detection result like in the step S1305.

Subsequently, in step S1311, the flash MPU 203 determines whether the bounce drive instruction (the instruction in the step S1109) was received from the camera MPU 101 like in the step S1306. When receiving the bounce drive instruction (YES in the step S1311), the flash MPU 203 proceeds with the process to step S1312. When the bounce drive instruction is not received (NO in the step S1312), this process is finished. It should be noted that the flash MPU 203 obtains the target bounce angles $\theta_X$ and $\theta_Y$ ($\theta_X = \theta_Y = 0$) that are transmitted from the camera MPU 101 in the step S1109 like in the step S1306 when the bounce drive instruction is received.

In the step S1312, the flash MPU 203 performs a bounce drive process so that the current bounce angles $\theta_A$ and $\theta_X$ match the target bounce angles ($\theta_X = \theta_X = 0$) received in the step S1306 or the step S1311. The details of the procedure of the bounce drive process in the step S1312 will be described later with reference to FIG. 14. In the following step S1313, the flash MPU 203 receives the emission instruction of the flash auxiliary light (the emission instruction in the step S1112) from the camera MPU 101. According to this emission instruction, the flash MPU 203 makes the light emitting section 204 emit the flash auxiliary light to irradiate the field in step S1314.

Then, the flash MPU 203 determines whether a re-emission instruction of the flash auxiliary light (the instruction in the step S1112 after the steps S1116 and S1119) was received in step S1315. When receiving the re-emission instruction of the flash auxiliary light (YES in the step S1315), the flash MPU 203 returns the process to the step S1314. When the re-emission instruction of the flash auxiliary light is not received (NO in the step S1315), the process proceeds to step S1316.

In the step S1316, the flash MPU 203 receives the bounce re-drive instruction (the instruction in the step S1114 or S1117) from the camera MPU 101. At the time, the drive target angles $\theta_X$ (=$\theta_{A0}$) and $\theta_Y$ (=$\theta_{B0}$) are obtained. In step S1317, the flash MPU 203 performs the bounce drive process so that the current bounce angles $\theta_A$ and $\theta_B$ match the target bounce angles $\theta_X$ (=$\theta_{A0}$) and $\theta_Y$ (=$\theta_{B0}$) received in the step S1316. The details of the of the bounce drive process in the step S1316 will be described later with reference to FIG. 14. Then, the flash MPU 203 finishes this process.

Figure 14:
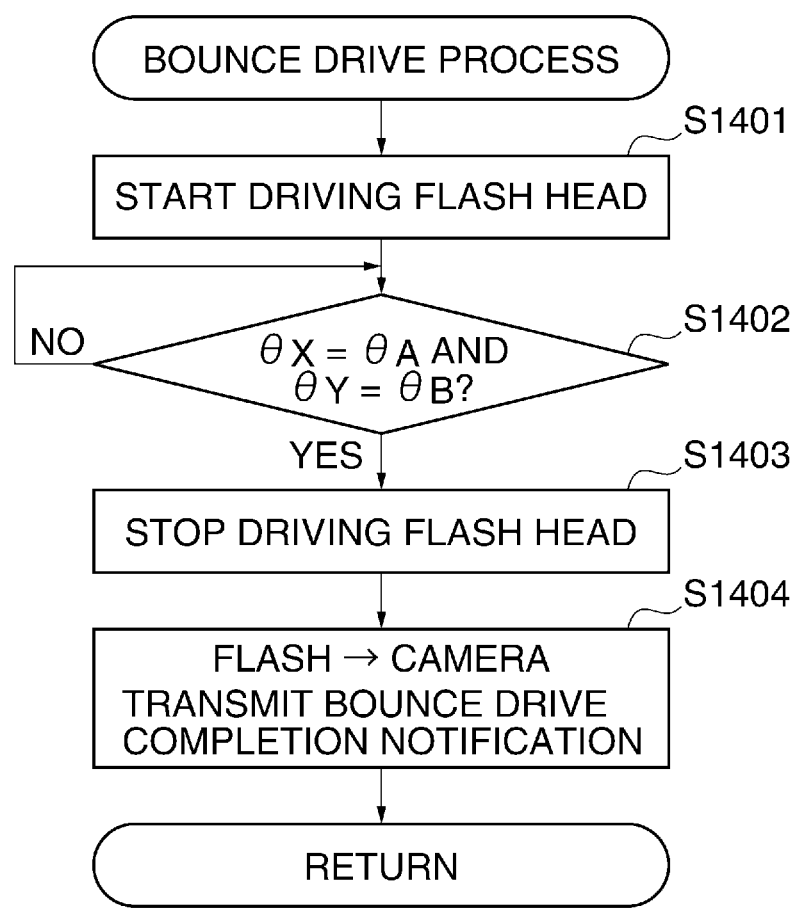
FIG. 14 is a flowchart showing a bounce drive process executed in the steps S1312 and S1317 in FIG. 13B.

FIG. 14 is a flowchart showing the bounce drive process executed in the steps S1312 and S1317. It should be noted that the process of the flowchart in FIG. 14 also applies to the bounce drive process in steps S1503, S1505, and S1508 in FIG. 15 mentioned later. Each step of the flowchart shown in FIG. 14 is executed because the flash MPU 203 reads a control program from the ROM (not shown), expands it to the RAM (not shown), and controls an action of each part of the external flash device 130.

In step S1401, the flash MPU 203 controls a motor (not shown) to start driving the motor by the bounce drive control unit 803, which starts the drive of the flash head 202. In step S1402, the flash MPU 203 detects the current bounce angles $\theta_A$ and $\theta_B$ of the flash head 202 by the bounce detection unit 205, and determines whether the detected bounce angles $\theta_A$ and $\theta_B$ match the target bounce angles $\theta_X$ and $\theta_Y$, respectively. The flash MPU 203 continues the determination while the detected bounce angles $\theta_A$ and $\theta_B$ do not match the target bounce angles $\theta_X$ and $\theta_Y$ (NO in the step S1402). When these angles are matched ($\theta_X=\theta_A$, and $\theta_Y=\theta_B$, YES in the step S1402), the process proceeds to step S1403.

It should be noted that the target bounce angles $\theta_X$ and $\theta_Y$ used as the criterions in the step S1402 are instructed in the step S1109, S1114, or S1117, when the bounce drive control is executed in the step S1312 or S1317. On the other hand, when the bounce drive control is executed in step S1503, S1505, or S1508 mentioned later, the target bounce angles $\theta_X$ and $\theta_Y$ used as the criterions in the step S1402 are calculated in each of these steps.

In the step S1403, the flash MPU 203 controls the motor to stop by the bounce drive control unit 803, which stops driving the flash head 202. In the next step S1404, the flash MPU 203 transmits a bounce drive completion notification to the camera MPU 101 through the camera terminal 206, and accordingly this process is finished.

Figure 15:
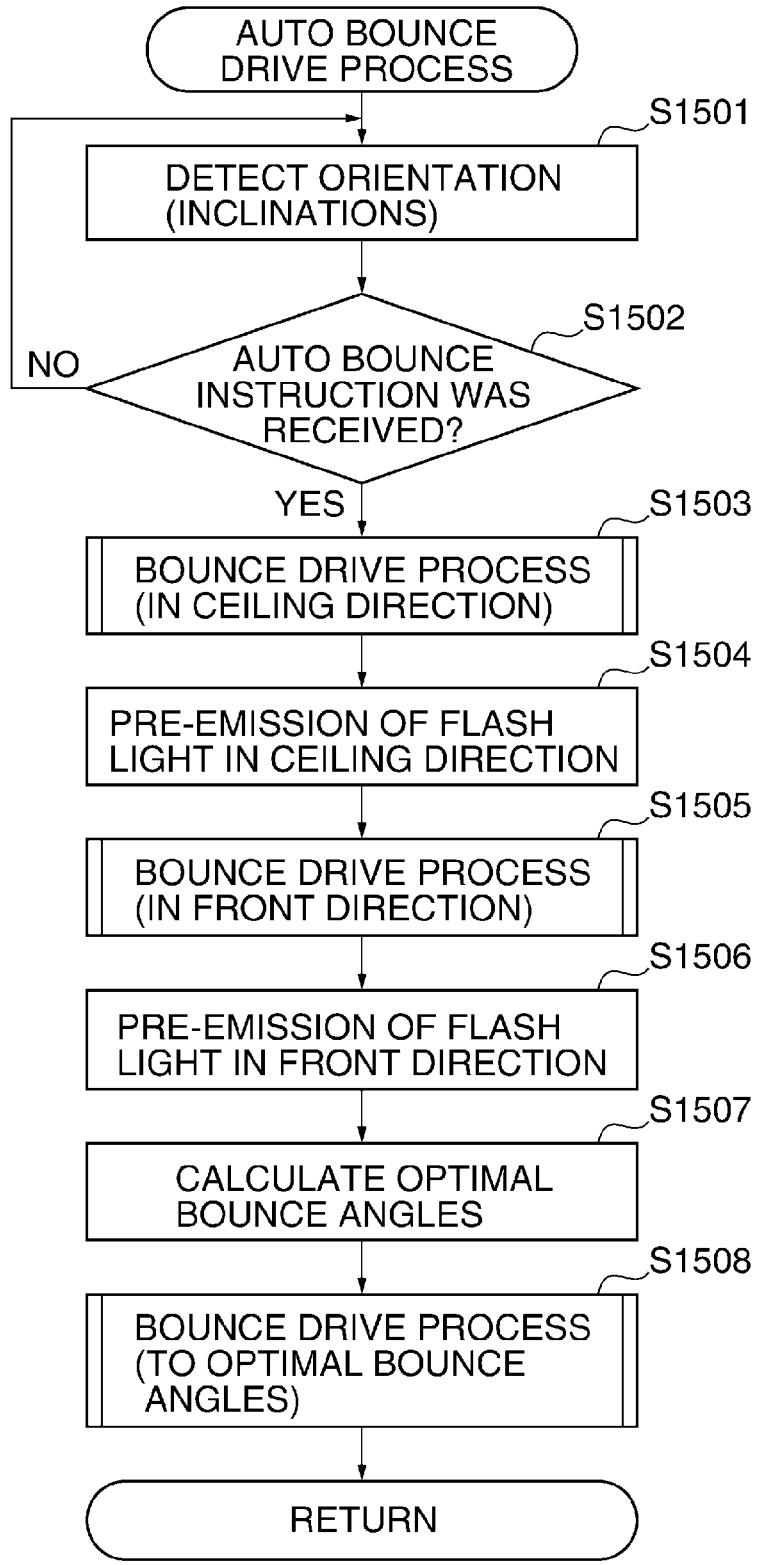
FIG. 15 is a flowchart showing an auto bounce drive process executed by the external flash device in FIG. 8.

FIG. 15 is a flowchart showing procedures of the auto bounce drive process executed by the external flash device 130. When receiving the bounce drive instruction in the steps S1109, S1114, or S1118, the flash MPU 203 executes the auto bounce drive process of the flowchart in FIG. 15. Each step of the flowchart shown in FIG. 15 is executed because the flash MPU 203 reads a control program from the ROM (not shown), expands it to the RAM (not shown), and controls an action of each part of the external flash device 130.

In step S1501, the flash MPU 203 detects the inclinations $\gamma$ and $\eta$ (see FIG. 9A and FIG. 9B) of the flash body 200 based on the horizontal state of the camera by the orientation detection unit 801. In step S1502, the flash MPU 203 determines whether the auto bounce drive instruction was received from the camera MPU 101. When the bounce drive instruction is not received (NO in the step S1502), the flash MPU 203 returns the process to the step S1501. When the bounce drive instruction was received (YES in the step S1502), the process proceeds to step S1503.

In step S1503, the bounce drive process shown in FIG. 14 is executed. The flash MPU 203 shall make the flash head 202 drive to the ceiling direction in the step S1503 in the second embodiment. The driving amount of the flash head 202 to be directed in the ceiling direction is calculated on the basis of the target bounce angles $\theta_X$ and $\theta_Y$, which are the target values at the time of the bounce drive, and the inclinations $\gamma$ and $\eta$ of the flash body 200. For example, when the detected inclinations of the flash head 202 are $\gamma=15$ degrees and $\eta=0$ degrees in the step S1501, the target bounce angles $\theta_X=0$ degrees and $\theta_Y=105$ (=90+15) degrees are calculated.

After the flash head 202 is driven to be directed in the ceiling direction in the step S1503, the flash MPU 203 makes the flash auxiliary light emit in step S1504. Accordingly, the light emitting section 204 emits the flash light toward the ceiling as a ranging object. The ranging photometry unit 804 obtains data of the reflected light from the ceiling, and the distance between the ceiling and the light emitting section 204 is calculated on the basis of the obtained data.

In the following step S1505, the bounce drive control process of the subroutine described in FIG. 14 is executed. The flash MPU 203 makes the flash head 202 drive to be directed in a front direction in which the flash head 202 faces the subject in the step S1505. Since the front direction is coincident with the photographing optical axis direction of the digital still camera 100, both of the target bounce angles $\theta_X$ and $\theta_Y$ are set to 0 degrees. After the flash head 202 is driven to be directed in the front direction in the step S1505, the flash MPU 203 makes the flash auxiliary light emit in step S1506. Accordingly, the light emitting section 204 emits the flash light toward the subject as a ranging object. The ranging photometry unit 804 obtains data of the reflected light from the subject, and the distance between the subject and the light emitting section 204 is calculated on the basis of the obtained data.

In the next step S1507, the flash MPU 203 calculates the optimal bounce angles by the bounce angle computing unit 802 on the basis of the inclinations $\gamma$ and $\eta$ of the flash body 200, the distance to the ceiling, and the distance to the subject that were obtained in the steps S1501, S1504, and S1506, respectively. It should be noted that the optimal bounce angles are calculated as the target bounce angles $\theta_X$ and $\theta_Y$ that are target values at the time of the bounce drive, and a well-known technique can be used as the calculation method thereof. Accordingly, the description is omitted.

In step S1508, the bounce drive control process of the subroutine described in FIG. 14 is executed. In the step S1508, the flash MPU 203 performs the bounce drive control on the basis of the target bounce angles $\theta_X$ and $\theta_Y$ for driving the flash head 202 to the optimal bounce angles calculated in the step S1507. Then, this process is finished.

The second embodiment is configured so that the optimal bounce angles are calculated on the basis of the data obtained by the ranging photometry unit 804 of the external flash device 130. However, the present invention is not restricted to this configuration. It may be configured so that the optimal bounce angles are calculated on the basis of data obtained by the photometry unit 112, the lens control unit 114, the orientation detection unit 116, or the like of the digital still camera 100.

Moreover, the second embodiment performs the bounce drive control, the emission of the flash auxiliary light, and the emission of the LED auxiliary light using the external flash device 130. However, if the built-in flash device 119 of the digital still camera 100 is able to change the irradiation direction with respect to the camera body, the bounce drive control, the emission of the flash auxiliary light, and the emission of the LED auxiliary light may be performed using the built-in flash device 119.

Furthermore, in the second embodiment, the camera MPU 101 of the digital still camera 100 obtains the bounce angles of the external flash device 130, controls the emission switching of the auxiliary light, and instructs to drive the flash head 202 to the target bounce angles $\theta_X$ and $\theta_Y$. However, the flash MPU 203 of the external flash device 130 may control the emission switching of the auxiliary light and instruct to drive the flash head 202 to the target bounce angles $\theta_X$ and $\theta_Y$ while communicating with the camera MPU 101 about the state of the external flash device 130.

Although the bounce drive is again performed after the emission of the flash auxiliary light to return the flash head to the original bounce angles in the second embodiment, the process for returning the flash head is unnecessary when the auto bounce drive is performed after the focus detection. In such a case, when the emission of the flash auxiliary light is used as a pre-emission in the front direction in the auto bounce drive control and the optimal bounce angles are calculated, efficiency of the auto bounce drive control is improved.

As mentioned above, when the light emitting section 204 of the external flash device 130 is in the bounce state where the bounce angles are not larger than the predetermined angles with respect to the direction directly facing to the field side, the focus detection with the flash auxiliary light is performed by performing the bounce drive in the second embodiment. Moreover, when the light emitting section 204 is in the bounce state where the bounce angles are larger than the predetermined angles with respect to the direction directly facing to the field side, the focus detection with the LED auxiliary light is performed previously. Accordingly, since an unnecessary bounce drive operation and an unnecessary emission of the auxiliary light are reduced, the power consumption is reduced, and the release delay is reduced.

Although the above mentioned two embodiments employ the LED auxiliary light, another light source may be employed as long as the pattern irradiation is possible and the irradiation range is narrower than the flash auxiliary light. For example, an electric lamp, EL light, etc. may be employed.

Although the embodiments of the invention have been described, the present invention is not limited to the above-mentioned embodiments, the present invention includes various modifications as long as the concept of the invention is not deviated. The embodiments mentioned above show examples of the present invention, and it is possible to combine the embodiments suitably.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-036628, filed Feb. 27, 2014, which is hereby incorporated by reference herein in its entirety.

What is claimed is:

1. An image pickup apparatus capable of mounting a light emission device with which a first light emitting section of which an irradiation direction can be changed with respect to a body of the light emission device and a second light emitting section of which an irradiation direction is fixed to the body are provided, the image pickup apparatus comprising:
    a focus detection unit;
    an obtaining unit configured to obtain information about the irradiation direction of the first light emitting section; and
    a control unit configured to control one of the first light emitting section and the second light emitting section on the basis of the information about the irradiation direction obtained by said obtaining unit as a light emitting section for irradiating with auxiliary light at the time when said focus detection unit performs focus detection.

2. The image pickup apparatus according to claim 1, wherein said control unit controls the first light emitting section as the light emitting section for irradiating with the auxiliary light when the information about the irradiation direction obtained by said obtaining unit shows that the irradiation direction of the first light emitting section is a reference direction.

3. The image pickup apparatus according to claim 2, wherein said control unit controls the second light emitting section as the light emitting section for irradiating with the auxiliary light when the information about the irradiation direction obtained by said obtaining unit shows that the irradiation direction of the first light emitting section is not the reference direction.

4. The image pickup apparatus according to claim 2, wherein said control unit controls the first light emitting section as the light emitting section for irradiating with the auxiliary light when the information about the irradiation direction obtained by said obtaining unit shows that the irradiation direction of the first light emitting section is included within a predetermined range including the reference direction.

5. The image pickup apparatus according to claim 4, wherein said control unit controls the second light emitting section as the light emitting section for irradiating with the auxiliary light when the information about the irradiation direction obtained by said obtaining unit shows that the irradiation direction of the first light emitting section is not included within the predetermined range.

6. The image pickup apparatus according to claim 4, wherein said control unit changes the irradiation direction of the first light emitting section to the reference direction before emitting the first light emitting section when the information about the irradiation direction obtained by said obtaining unit shows that the irradiation direction of the first light emitting section is included within the predetermined range including the reference direction.

7. The image pickup apparatus according to claim 2, wherein the reference direction is parallel to a photographing optical axis.

8. The image pickup apparatus according to claim 1, wherein said obtaining unit obtains the information about the irradiation direction of the first light emitting section from the light emission device.

9. A light emission device capable of mounting on an image pickup apparatus, comprising:
   a first light emitting section of which an irradiation direction can be changed with respect to a body of the light emission device;
   a second light emitting section of which an irradiation direction is fixed to the body; and
   a control unit configured to control one of said first light emitting section and said second light emitting section as a light emitting section for irradiating with auxiliary light at the time when the image pickup apparatus performs focus detection according to the irradiation direction of said first light emitting section.

10. The light emission device according to claim 9, wherein said control unit controls said first light emitting section as the light emitting section that irradiates with the auxiliary light when the irradiation direction of said first light emitting section is a reference direction.

11. The light emission device apparatus according to claim 10, wherein said control unit controls said second light emitting section as the light emitting section that irradiates with the auxiliary light when the irradiation direction of said first light emitting section is not the reference direction.

12. The light emission device according to claim 10, wherein said control unit controls said first light emitting section as the light emitting section that irradiates with the auxiliary light when the irradiation direction of said first light emitting section is included within a predetermined range including the reference direction.

13. The light emission device according to claim 12, wherein said control unit controls said second light emitting section as the light emitting section that irradiates with the auxiliary light when the irradiation direction of said first light emitting section is not included within the predetermined range.

14. The light emission device according to claim 12, further comprising:
   an irradiation direction change unit configured to change the irradiation direction of said first light emitting section to the reference direction before emitting said first light emitting section when the irradiation direction of said first light emitting section is included within the predetermined range including the reference direction.

15. The light emission device according to claim 9, wherein the reference direction is parallel to the irradiation direction of said second light emitting section.

16. The light emission device according to claim 9, further comprising:
   a detection unit configured to detect information about the irradiation direction of said first light emitting section,
   wherein said control unit controls one of said first light emitting section and said second light emitting section as a light emitting section for irradiating with auxiliary light at the time when the image pickup apparatus performs focus detection according to the detection result of said detection unit.

17. The light emission device according to claim 9, wherein said second light emitting section irradiates with a light that has a specified pattern.

18. The light emission device according to claim 9, wherein said second light emitting section has an irradiation range narrower than that of said first light emitting section.

19. An image pickup system comprising:
   a focus detection unit;
   a first light emitting section of which an irradiation direction can be changed with respect to a body of the light emission device;
   a second light emitting section of which an irradiation direction is fixed to the body; and
   a control unit configured to control one of said first light emitting section and said second light emitting section as a light emitting section for irradiating with auxiliary light at the time when said focus detection unit performs focus detection according to the irradiation direction of said first light emitting section.

20. A focus detection method for an image pickup system having a focus detection unit, a first light emitting section of which an irradiation direction can be changed with respect to a body, and a second light emitting section of which an irradiation direction is fixed to the body, the focus detection method comprising:
   an obtaining step of obtaining information about the irradiation direction of the first light emitting section;
   a control step of controlling one of the first light emitting section and the second light emitting section as a light emitting section for irradiating with auxiliary light at the time when the focus detection unit performs focus detection according to the irradiation direction of the first light emitting section; and
   a focus detection step of performing focus detection while irradiating with the auxiliary light by one of the first light emitting section and the second light emitting section.

* * * * *